US010548026B1

(12) United States Patent
Liu

(10) Patent No.: US 10,548,026 B1
(45) Date of Patent: Jan. 28, 2020

(54) FREQUENCY PLANNING AND HEXAGON PATTERN LAYOUTS OF LINEAR SUB-MESH NETWORKS OF A WIRELESS MESH NETWORK FOR BROADBAND CONNECTIVITY

(71) Applicant: AMAZON TECHNOLOGIES, INC., Seattle, WA (US)

(72) Inventor: Jungtao Liu, Saratoga, CA (US)

(73) Assignee: Amazon Technologies, Inc., Seattle, WA (US)

(*) Notice: Subject to any disclaimer, the term of this patent is extended or adjusted under 35 U.S.C. 154(b) by 33 days.

(21) Appl. No.: 15/465,236

(22) Filed: Mar. 21, 2017

(51) Int. Cl.
| H04B 7/00 | (2006.01) |
| H04W 16/24 | (2009.01) |
| H04B 7/155 | (2006.01) |
| H04L 12/28 | (2006.01) |
| H04L 5/14 | (2006.01) |
| H04W 76/15 | (2018.01) |
| H04W 84/18 | (2009.01) |

(52) U.S. Cl.
CPC ........ *H04W 16/24* (2013.01); *H04B 7/15507* (2013.01); *H04L 5/14* (2013.01); *H04L 12/2801* (2013.01); *H04W 76/15* (2018.02); *H04W 84/18* (2013.01)

(58) Field of Classification Search
None
See application file for complete search history.

(56) References Cited

U.S. PATENT DOCUMENTS

| 4,727,590 A * | 2/1988 | Kawano | H04B 7/2606 455/17 |
| 7,200,407 B1 * | 4/2007 | Smith | H04W 72/06 455/447 |
| 7,583,619 B2 * | 9/2009 | Edwards | H04B 7/15557 370/279 |
| 2005/0059342 A1 | 3/2005 | Engels et al. | |
| 2006/0089148 A1 | 4/2006 | Zhao et al. | |
| 2008/0101325 A1 * | 5/2008 | Bao | H04B 7/2606 370/345 |
| 2008/0165748 A1 | 7/2008 | Visotsky et al. | |
| 2008/0240054 A1 * | 10/2008 | Sandhu | H04B 7/2606 370/338 |
| 2009/0247206 A1 * | 10/2009 | Yacono | H04W 24/02 455/515 |
| 2010/0144356 A1 * | 6/2010 | Li | H04B 7/2606 455/446 |

(Continued)

*Primary Examiner* — Kwang B Yao
*Assistant Examiner* — Juvena W Loo
(74) *Attorney, Agent, or Firm* — Lowenstein Sandler LLP

(57) ABSTRACT

Network hardware devices are organized in a wireless mesh network (WMN) including a base station node (BSN) device connected to a tower in a geographic area and multiple home access node (HAN) relay devices located in a geographic area and separated from one another by a distance up to approximately 500 meters. A first set of HAN relay devices is organized in a first linear sub-mesh network with a first deployment layout having an S-shape or an inverse S-shape. Each of the first set of HAN relay devices establishes a frequency-division duplex (FDD) link between itself and at least one other HAN relay device and at least one of the first set of HAN relay devices establishes a time-division duplex (TDD) link over which the at least one of the HAN relay devices communicates with the BSN device.

20 Claims, 26 Drawing Sheets

(56) References Cited

U.S. PATENT DOCUMENTS

| | | | |
|---|---|---|---|
| 2010/0284446 A1* | 11/2010 | Mu | H04B 7/15521 375/211 |
| 2010/0302999 A1* | 12/2010 | Hui | H04B 7/155 370/315 |
| 2011/0111783 A1* | 5/2011 | Chayat | H04W 16/12 455/509 |
| 2012/0275352 A1* | 11/2012 | Diao | H04B 7/15542 370/280 |
| 2013/0029589 A1* | 1/2013 | Bontu | H04W 16/14 455/7 |
| 2014/0050128 A1* | 2/2014 | Campoy Cervera | H04W 72/0426 370/280 |
| 2014/0161057 A1* | 6/2014 | Hejazi | H04W 52/243 370/329 |

* cited by examiner

- Han-R supporting BSN connection
  - 4 radios supporting 2 HanR-to-HanR FDD links
  - 1 radio supporting BSN-to-HanR TDD connection

1 + 1 + 1
1 + 1 + 1
1 + 1

3 radios supporting 3 HanR-to Han sectors

- Han-Rs 4 or 6 radios supporting 2-3 HanR-to-HanR FDD links

1 + 1 + 1
1 + 1 + 1
1 + 1

3 radios supporting 3 HanR-to Han sectors

FIG. 17

FREQUENCY PLANNING AND HEXAGON PATTERN LAYOUTS OF LINEAR SUB-MESH NETWORKS OF A WIRELESS MESH NETWORK FOR BROADBAND CONNECTIVITY

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present embodiments will be understood more fully from the detailed description given below and from the accompanying drawings of various embodiments, which, however, should not be taken to limit the claims to the specific embodiments, but are for explanation and understanding only.

FIG. 17 illustrates three types of HAN relay devices in the tessellated hexagon topology according to one embodiment.

DETAILED DESCRIPTION

Figure 1:
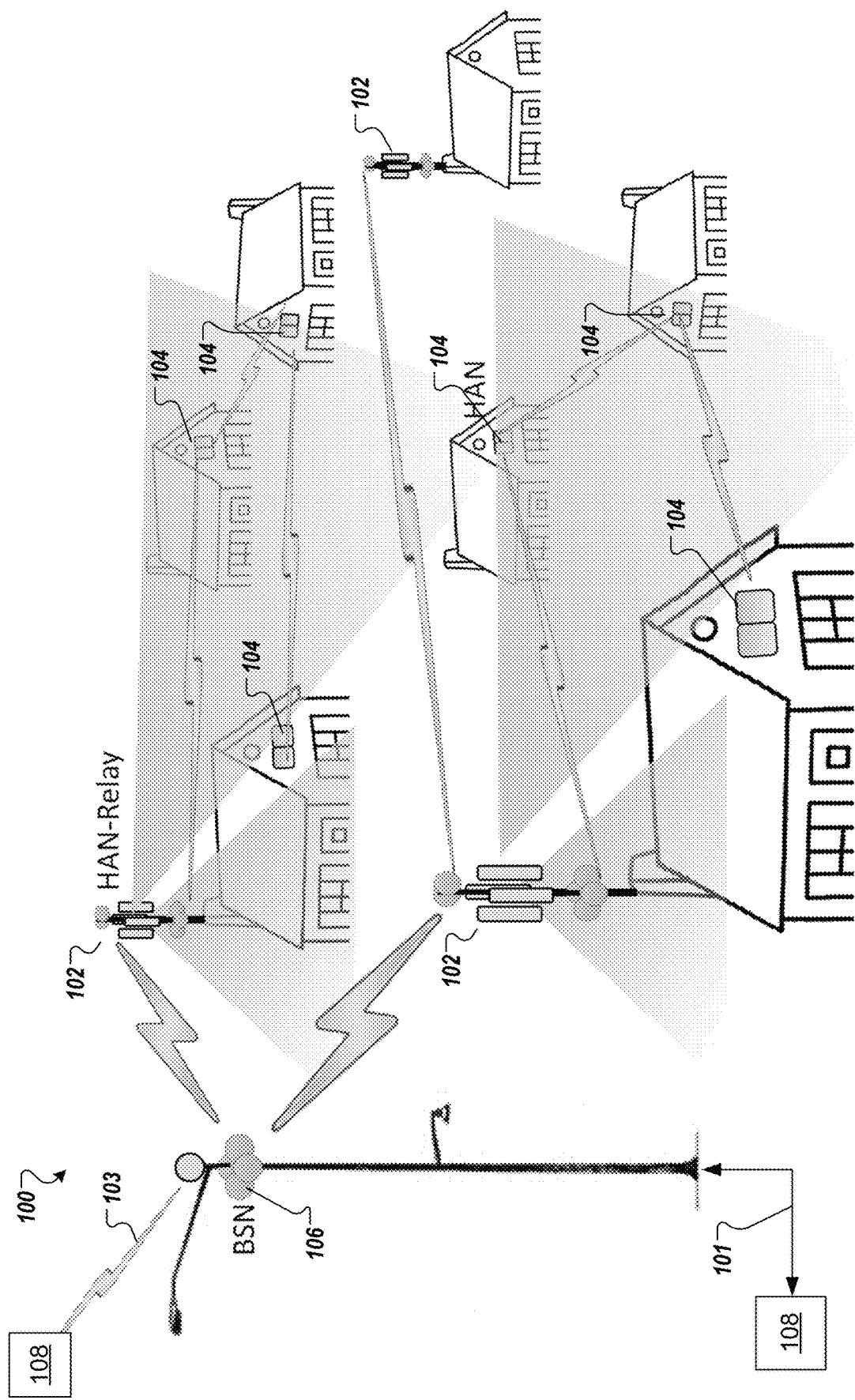
FIG. 1 is a network diagram of network hardware devices, organized in a wireless mesh network (WMN), for providing broadband connectivity to broadband Internet infrastructure according to one embodiment.

A wireless mesh network (WMN) containing multiple mesh network devices, organized in a multi-level mesh topology, is described. The mesh network devices in the WMN cooperate to provide broadband connectivity to broadband Internet infrastructure. The embodiments described herein may be implemented as suitable broadband Internet infrastructure in suburban geographic areas as described herein. The WMN may be deployed in a suburban environment to provide broadband connectivity to a home as an alternative to traditional wired Internet service providers (ISPs). The WMN may use a combination of fixed wireless and mesh networking to deliver wireless broadband to a suburban home. Some outdoor fixed wireless links have been able to provide 50 Mbps over a distance of 18 kilometers. By overlaying a mesh network in a various mesh topologies (e.g., star topology, peer-to peer topology, mesh pattern topology, or the like), the WMN may provide wireless broadband to a block of homes within proximity in a suburban environment. Such a network would allow customers to access to the Internet for web services, content streaming, or the like.

Described herein are various types of network hardware devices, including BSN devices, HAN relay devices, and HAN devices to provide broadband connectivity to broadband Internet structure. Multiple network hardware devices are connected wirelessly through a first sub-mesh network and other network hardware devices are connected wirelessly through a second sub-mesh network. Multiple network hardware devices are connected together over point-to-point (PtP) wireless connections using beam-steering antennas as described in more detail herein. The first sub-mesh network may be considered the backhaul and the second sub-mesh network can be considered the access. Other sector antennas may be used to wirelessly connect devices over point-to-multiple-points (PtMP) wireless connections. These antennas may be fixed-beam antennas as they are not beam-steering antennas used for PtP wireless connections.

As described in various embodiments herein, the network hardware devices are organized in a WMN in which a HAN relay device that includes a first set of radios, each of the first set of radios being coupled to a beam-steering antenna and each of the first set of radios establishing a first point-to-point (PtP) wireless connection over which the HAN relay device communicates with a second HAN relay device in a first sub-mesh network of HAN relay devices. The HAN relay device also includes a second set of radios, each of the second set of radios being coupled to a beam-steering antenna and each of the second set of radios establishing a second PtP wireless connection over which the HAN relay device communicates with at least one of multiple HAN devices in a second sub-mesh network in the WMN. In other embodiments, the WMN includes a base station node (BSN) device connected to a tower in a geographic area and multiple HAN relay devices located in a geographic area and separated from one another by a distance up to approximately 500 meters. A first set of HAN relay devices is organized in a first linear sub-mesh network with a first deployment layout having an S-shape or an inverse S-shape. Each of the first set of HAN relay devices establishes one or more frequency-division duplexing (FDD) links between itself and at least one other HAN relay device and at least one of the first set of HAN relay devices establishes a time-division duplex (TDD) link over which the at least one of the HAN relay devices communicates with the BSN device FDD is a method for establishing a full-duplex communications link that uses two different radio frequencies for transmitter and receiver operations. The transmit direction and receive direction frequencies are separated by a defined frequency offset.

As described herein, the network hardware devices can provide broadband connectivity to broadband Internet infrastructure to various consumer devices, such as laptop computers, desktop computers, televisions, tablet computers, home automation systems, personal digital assistants, or the like. In the case of client consumption devices, the WMN can provide broadband connectivity to content files, as well as other web-based services. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In some of the embodiments described herein, the mesh network architecture may include a limited number of point-of-presence (POP) nodes that have access to the Internet, and the hardware network devices of the two sub-mesh networks can distribute data between the POP nodes and the client devices. In some cases, the WMN can be deployed in a geographical area in which broadband Internet is limited. In other cases, the WMN can be deployed in suburban areas as an alternative to traditional wired infrastructures for broadband Internet. The WMN can scale to support a geographic area based on the number of mesh network devices, and the corresponding distances for successful communications over the wireless channels by those hardware network devices.

Although various embodiments herein are directed to content delivery, such as for the Amazon Instant Video (AIV) service, the WMNs, and corresponding mesh network devices, can be used as a platform suitable for delivering high bandwidth content in any application. The embodiments described herein are compatible with existing content delivery technologies, and may leverage architectural solutions, such as CDN surfaces like the Amazon AWS CloudFront service. Amazon CloudFront CDN is a global CDN service that integrates with other Amazon Web services products to distribute content to end users with low latency and high data transfer speeds. The embodiments described herein can be an extension to this global CDN, but in suburban environments in particular. The embodiments described herein may provide users in these environments with a content delivery experience equivalent to what the users would receive on a traditional broadband Internet connection. The embodiments described herein may be used to optimize deployment for traffic types (e.g. streaming video) that are increasingly becoming a significant percentage of broadband traffic and taxing existing infrastructure in a way that is not sustainable.

FIG. 1 is a network diagram of network hardware devices, organized in a WMN 100, for providing broadband connectivity to broadband Internet infrastructure according to one embodiment. The WMN 100 includes multiple network hardware devices that connect together to transfer digital data through the WMN 100 to be delivered to one or more client devices (not illustrated in FIG. 1) connected to the WMN 100. The WMN 100 includes two sub-mesh networks: a first sub-mesh network of HAN relay devices 102 and a second sub-mesh network of HAN devices 104. The WMN 100 also includes a BSN device 106 that wirelessly connects to the HAN relay devices 102. The BSN device 106 may operate as a point-of-presence device that has a wired connection 101 to broadband Internet infrastructure 108, a wireless connection 103 to broadband Internet infrastructure 108, or both. The wireless connection 103 may be a point-to-point (PtP) wireless connection to a CDN device (server of a CDN or a CDN node) of an Internet Service Provider (ISP). The CDN device may be a POP device (also referred to as a POP device), an edge server, a content server device or another device of the CDN. The BSN device 106 can act as a single ingress point to the WMN 100, whereas the POP device of the broadband Internet infrastructure may be one of many in a CDN. Alternatively, the WMN 100 may include more than one BSN device 106 as described herein, and the BSN device 106 may act as one of multiple ingress points to the WMN 100. In other embodiments, multiple BSN devices 106 may be deployed in the WMN 100, but the number of BSN devices 106 should be much smaller than a total number of network hardware devices (102, 104) in the WMN 100. In one embodiment, the BSN device 106 is a single gateway device to provide Internet connectivity to the HAN devices 104 and HAN relay devices 102 within the WMN 100. In another embodiment, the BSN device 106 is one of multiple gateway devices to provide Internet connectivity to the HAN devices 104 and HAN relay devices 102 within the WMN 100. The wireless connection 103 may be a directional microwave link between the BSN device 106 and another device of the broadband Internet infrastructure. Although a point-to-point wireless connection can be used, in other embodiments, other communication channels may be used. For example, a microwave communication channel may be used to exchange data. Other long distance communication channels may be used, such as a fiber-optic link as the wired connection 101, satellite link, cellular link, or the like. It should be noted that not all the hardware network devices (HAN relay devices 102, HAN devices 104) may not have direct access to the BSN device 106, but can use one or more intervening nodes to transfer data between the hardware network devices and the BSN device 106. The intervening nodes may also cache digital data that can be accessed by other nodes. The network hardware devices may also determine a shortest possible route between the requesting node and a node where the digital data is stored.

Figure 2:
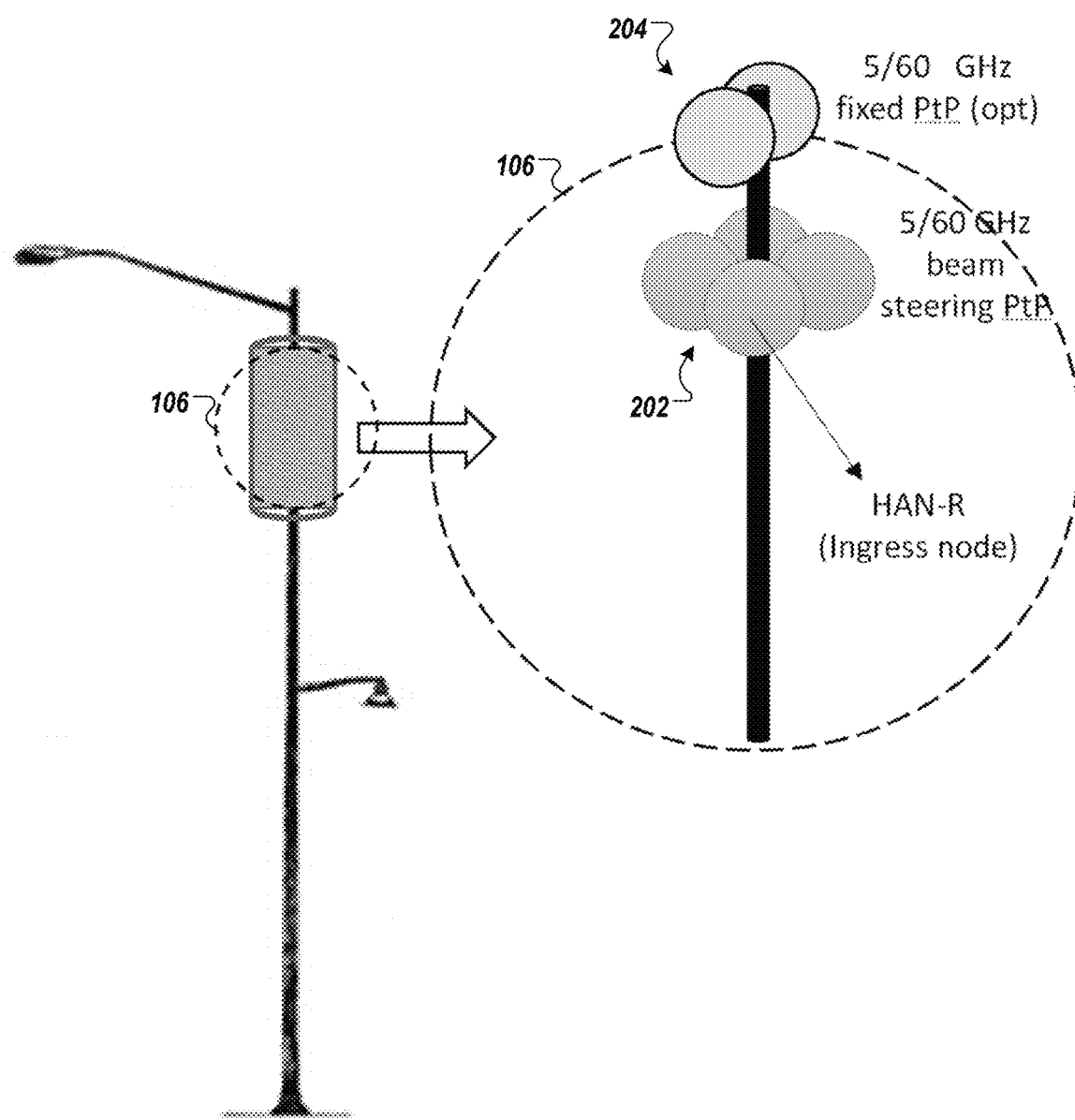
FIG. 2 illustrates a Base Station Node (BSN) device connected to a light pole in a geographic area according to one embodiment.
Figure 2:
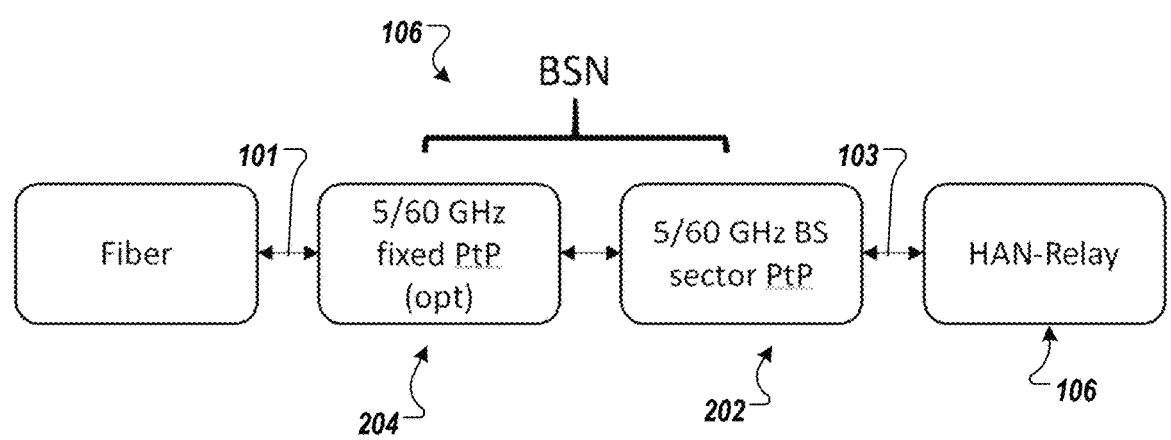
Figure 8:
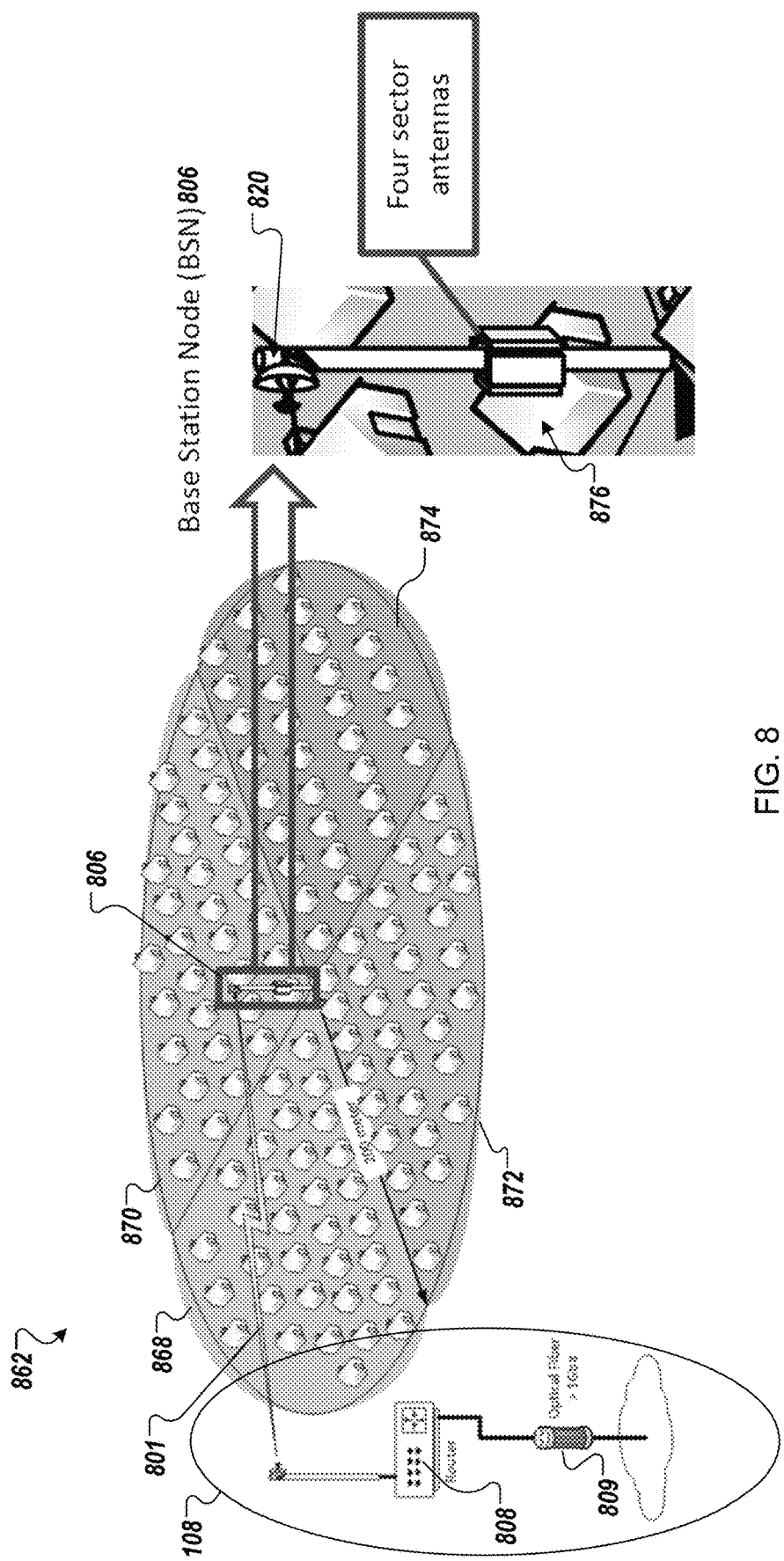
FIG. 8 illustrates a WMN in a PtMP star topology according to one embodiment.
Figure 10:
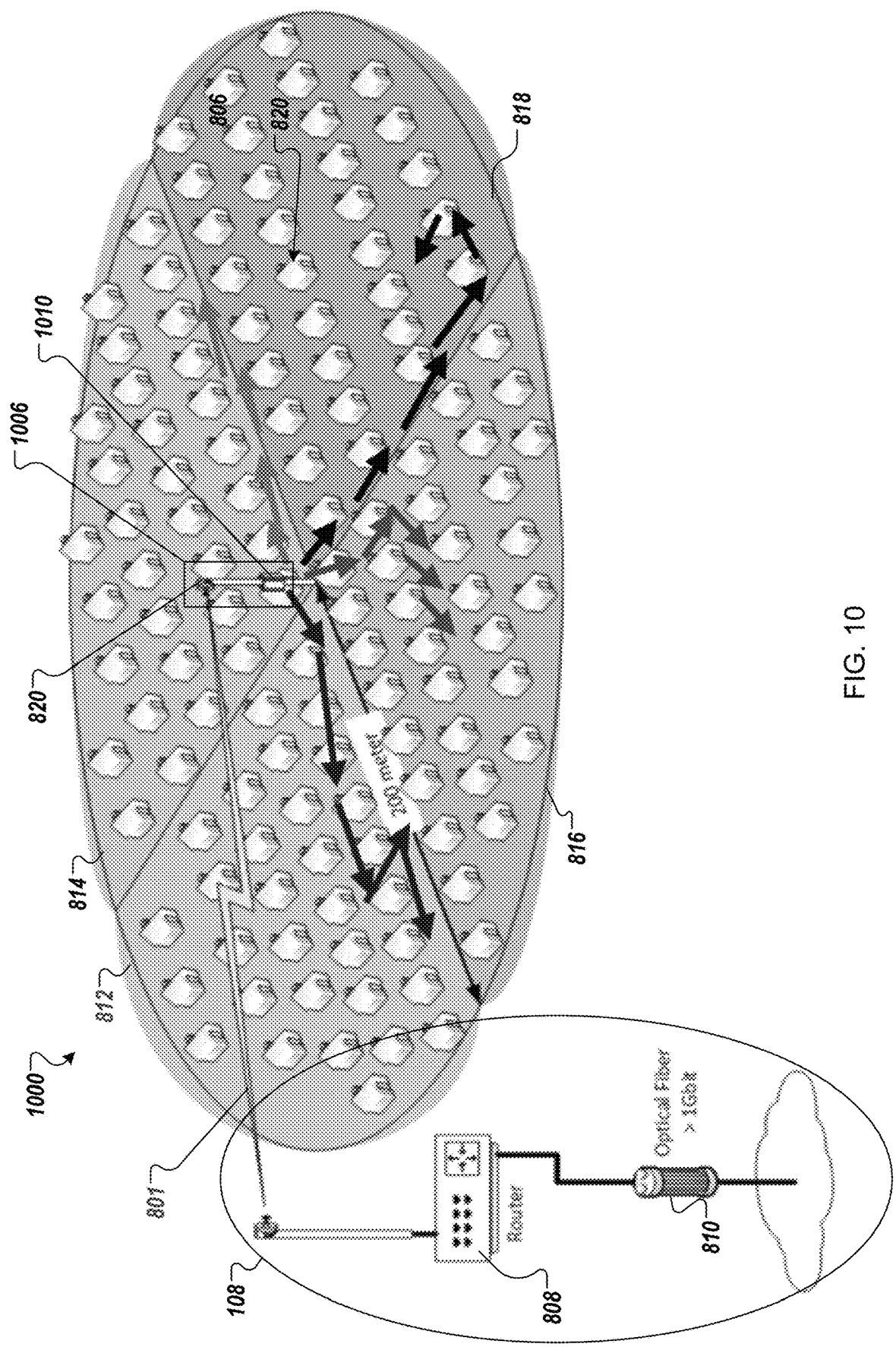
FIG. 10 illustrates a WMN in a PtP mesh network topology according to one embodiment.

FIG. 2 illustrates a BSN device 106 connected to a light pole in a geographic area according to one embodiment. A coverage area of the BSN device 106 can be split into four quadrants, called sectors, with four sector high-gain antennas 202. These four sector high-gain antennas 202 may be beam-steering antennas to establish PtP wireless connections with other hardware network devices in the WMN. In some embodiments, the four sector high-gain antennas 202 can be high-gain beam steering antennas 202. The BSN device 106, or at least the four sector high-gain antennas 202, can be connected to a tower or other structure. The four sector high-gain antennas 202 can be disposed on a light pole, a lamp post, a tower, or other structure that can put the BSN device 106 at a specified height to reduce the possibility of interfering structures. In some instances, the sector high-gain antennas 202 are referred to as sector antennas since they are disposed to cover sectors of the geographical area, as illustrated in FIGS. 8 and 10, for examples. In one embodiment, the four sector high-gain antennas 202 can be disposed 8 meters off the ground to provide line of sight (LoS) to other hardware network devices in the WMN. One of the four sector high-gain antennas 202 provides data connections to HAN relay devices 102 within its sector using a data stream communicated via the wired connection 101 (fiber or fixed backhaul radios) or the wireless connection 103 or both. Since the four sector high-gain antennas 202 are beam-steering antennas, each of the four sector high-gain antennas 202 can be used to connect to the HAN relay device 102 that can deliver an optimal data connectivity. It should be noted that various embodiments described herein include four sectors. Alternatively, in other embodiments, more or less sectors may be used.

As depicted in FIG. 2, the BSN device 106 uses one of the four sector high-gain antennas 202 to establish a PtP wireless connection 103 with the HAN relay device 102 (as an ingress node). The BSN device 106 can establish PtP wireless connections with other HAN relay devices 102 using the other sector high-gain antennas 202. In another embodiment, the BSN device 106 also includes one or more fixed-beam antennas 204 to establish PtP wireless connections with other network devices. For example, the BSN device 106 can establish a PtP wireless connection with a second BSN device 106 in the WMN 100. The BSN device 106 may not include a wired connection 101 and can communicate with the second BSN device 106 that does have a wired connection. The second BSN device 106 may be a backhaul node with fiber access. The BSN device 106 can communicate with other BSN devices 106 for other purposes. The fixed-beam antennas 204 may be optional for BSN devices that have direct wired connections to the broadband Internet infrastructure 108. The fixed-beam antennas 204 may permit the BSN device 106 to have large data throughput, such as approximately 1 to 7 Gbps). The fixed-beam antennas 204 can radiate electromagnetic energy at 5 GHz or 60 GHz, depending on the required data rate and the communication distance needed for proper wireless communication between devices. The fixed-beam antennas 204 can be coupled to radios in the BSN device 106 as described in more detail below with respect to FIG. 3. The radios may be bidirectional transceivers that transmit and receive wireless signals via the fixed-beam antennas 204.

Also, as depicted in FIG. 2, the BSN device 106 may include a transceiver to communicate with the broadband Internet infrastructure 108 via a wired connection 101. The wired connection 101 can be an optical fiber connection of greater than 1 Gbps throughput. The optical fiber connection can be through a router. The router may be part of the BSN device 106 or part of another device with which the BSN device 106 communicates.

Figure 3:
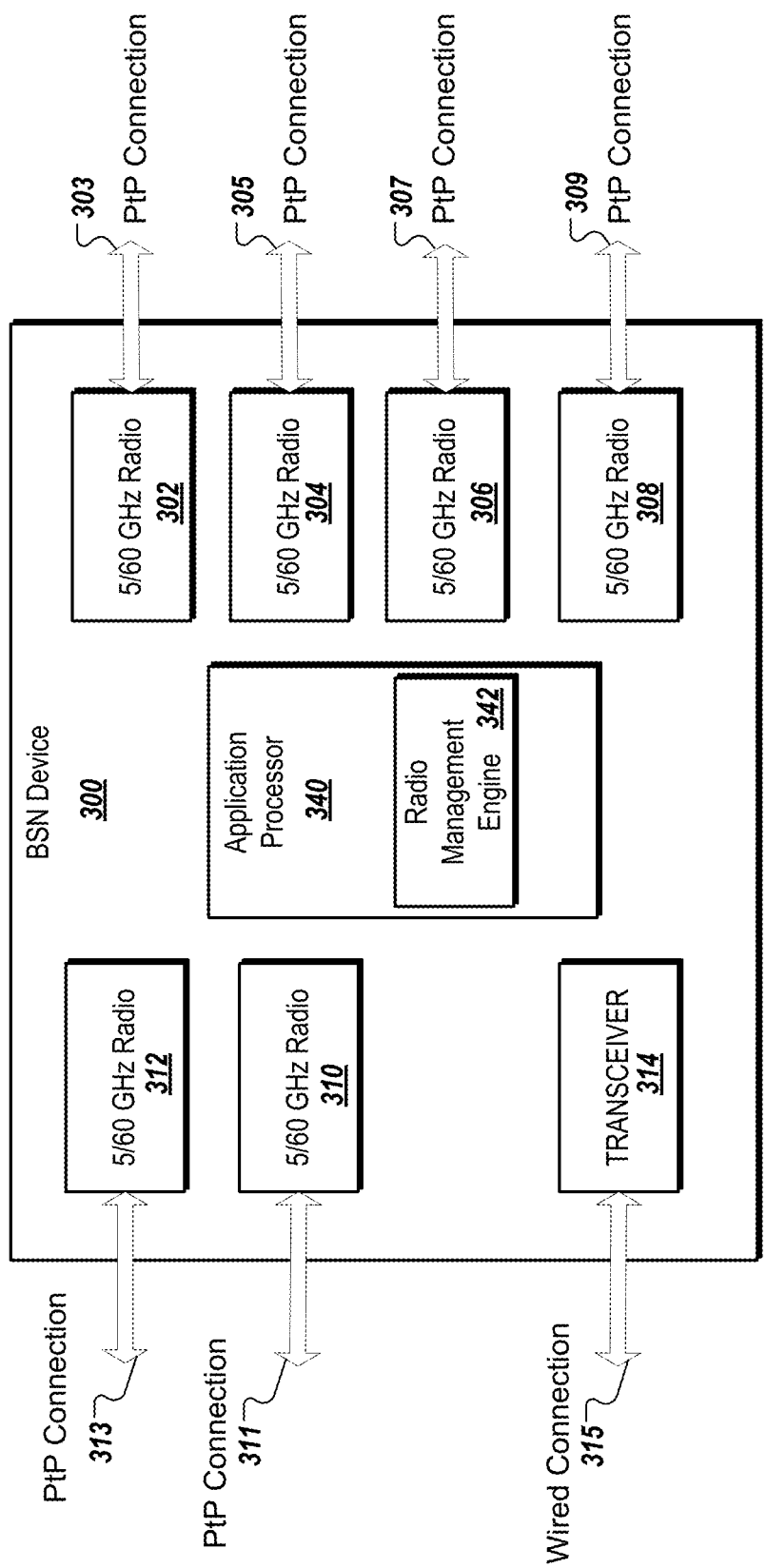
FIG. 3 is a block diagram of a BSN device with multiple radios and an application processor according to one embodiment.

FIG. 3 is a block diagram of a BSN device 300 with multiple radios and an application processor according to one embodiment. It should be noted that the BSN device 300 can be the BSN device 106 described above with respect to FIGS. 1-2. The BSN device 300 includes a first 5/60 GHz radio 302, a second 5/60 GHz radio 304, a third 5/60 GHz radio 306, a fourth 5/60 GHz radio 308, a fifth 5/60 GHz radio 310, a sixth 5/60 GHz radio 312, and a transceiver 314. The first 5/60 GHz radio 302 creates a first PtP wireless connection 303 between the BSN device 300 and a HAN relay device (not illustrated in FIG. 3) in a first sector of the WMN 100. The second 5/60 GHz radio 304 creates a second PtP wireless connection 305 between the BSN device 300 and a HAN relay device (not illustrated) in a second sector of the WMN 100. The third 5/60 GHz radio 306 creates a third PtP wireless connection 307 between the BSN device 300 and a HAN relay device (not illustrated) in a third sector of the WMN 100. The fourth 5/60 GHz radio 308 creates a fourth PtP wireless connection 309 between the BSN device 300 and a HAN relay device (not illustrated) in a fourth sector of the WMN 100. Each of the first, second, third, and fourth 5/60 GHz radios 302-308 is connected to a beam-steering antenna, such as one of the four high-gain sector antennas 202 of FIG. 2. Each of the first, second, third, and fourth 5/60 GHz radios 302-308 provides a data connection to a HAN relay device within its sector using a data stream received from the wired connection 101 or the wireless connection 103. The first, second, third, and fourth 5/60 GHz radios 302-308 can be used to provide backhaul for a first sub-mesh network of HAN relay devices 102, as described herein. It should also be noted that multiple HAN devices can be organized in a second sub-mesh network of HAN devices to provide access to devices within the respective structures to which the HAN devices reside.

The BSN device 300 also includes the fifth 5/60 GHz radio 310 creates a PtP wireless connection 311 between the BSN device 300 and a backhaul node with fiber access, such as another BSN device 106 in the WMN 100. The sixth 5/60 GHz radio 312 creates a PtP wireless connection 313 between the BSN device 300 and another backhaul node with fiber access, such as another BSN device 106. In another embodiment, there may be additional radios used for PtP wireless connections like PtP wireless connections 311, 313. Also, in other embodiments, more or less radios can be used for PtP wireless connections 303-309. Alternatively, different number of 5 GHz radios may be used for more or less PtP wireless connections with other mesh network devices.

The BSN device 300 also includes the transceiver 314 to create a wired connection 315 between the BSN device 300 and one or more devices in the broadband Internet infrastructure 108, such as a router coupled to an optical fiber connection. The transceiver 314 can be used for high speed data transmission with the broadband Internet infrastructure 108.

In other embodiments, the BSN device 300 may include other radios for other types of wireless communications, such as a cellular radio to communicate using one of the cellular technologies. For example, a network control service can be hosted in the cloud and the cellular connection can be used to communicate control information with the network control service to manage the WMN 100. In other embodiments, as long as there is Internet connectivity in the WMN 100, the control information can be communicated via the Internet connectivity, instead of the cellular connection. The cloud services of the WMN 100 (also referred to as software defined network (SDN)) can include mechanisms to deal with network devices that become unavailable, adding, removing, or modifying existing network devices in the WMN 100. The cloud services may also include mechanisms for remote health and management. For example, there may be a remote health interface, a management interface, or both to access the network devices for this purpose. The cloud services can also include mechanisms for securing the WMN 100 and the content that resides in the WMN 100. For example, the cloud services can control device access, Digital Rights Management (DRM), and node authentication.

The BSN device 300 includes the application processor 340 to process data signals in connection with communicating with other network devices in a WMN. The application processor 340 is coupled to the radios 302-312 and the transceiver 314. In other embodiments, other processing devices may be used. The application processor 340 can execute various modules, such as a radio management engine 342. The radio management engine 342 can be a computer program that may operate as a background process, such as a daemon that is started at boot time and performs the tasks described above with respect to communications using the various radios described herein. The radio management engine 342 can configure hardware, run scheduled tasks, as well as perform the variety of tasks described above to communicate data packets or control packets as described herein. In one embodiment, the radio management engine 342 can communicate with the network control service hosted in the cloud using, for example, the transceiver 314 via the wired connection 315. The processing logic of radio management can be implemented locally in the radio management engine 342 at the application processor 340. Alternatively, some or all of the processing logic of the radio management engine 342 can be performed in a radio management engine hosted in the cloud as part of the network control service. Alternatively, the network control service can implement a radio management engine and the application processor 340 can implement the radio management engine 342 as a distributed system. Alternatively, the radio management engine 342 performs the various operations and reports the status, configuration, or other information to the network control service. In one embodiment, the radio management engine 342 performs the method(s) described herein. Alternatively, the radio management engine 342 can perform other operations as described herein.

In one embodiment, the application processor 340 processes data signals in connection with communicating with other network devices in a WMN, such as the HAN relay device 102. The application processor 340 may be coupled to a first radio that is coupled to a first beam-steering antenna, a second radio that is coupled to a second beam-steering antenna. The application processor 340 communicates data with a second device over the wired connection 315 using the transceiver 314. The application processor 340 also communicates the data with a HAN relay device 102 using the first radio and the first beam-steering antenna over a PtP wireless connection. The application processor 340 can also communicate additional data to a second HAN relay device 102 over another PtP wireless connection using the second radio and the corresponding second beam-steering antenna.

In another embodiment, the BSN device 106 includes a first radio to communicate with a server of a content delivery network (CDN) over at least one of a first wired connection or a PtP wireless connection. The BSN device 106 also includes a set of four 60 GHz radios. Each of the set of four 60 GHz radios is coupled to a beam-steering antenna in one of four sectors of the BSN device 106. Each of the set of four 60 GHz radios establishes a PtP wireless connection over which the BSN device 106 wirelessly communicates with at least some of the HAN relay devices 102 in the geographic area.

In one embodiment, the BSN device 106 is one of multiple ingress nodes of the WMN 100 to provide Internet connectivity to devices within the WMN 100. In another embodiment, the BSN device 106 is the only ingress node of the WMN 100 to provide Internet connectivity to devices within the WMN 100.

Figure 4:
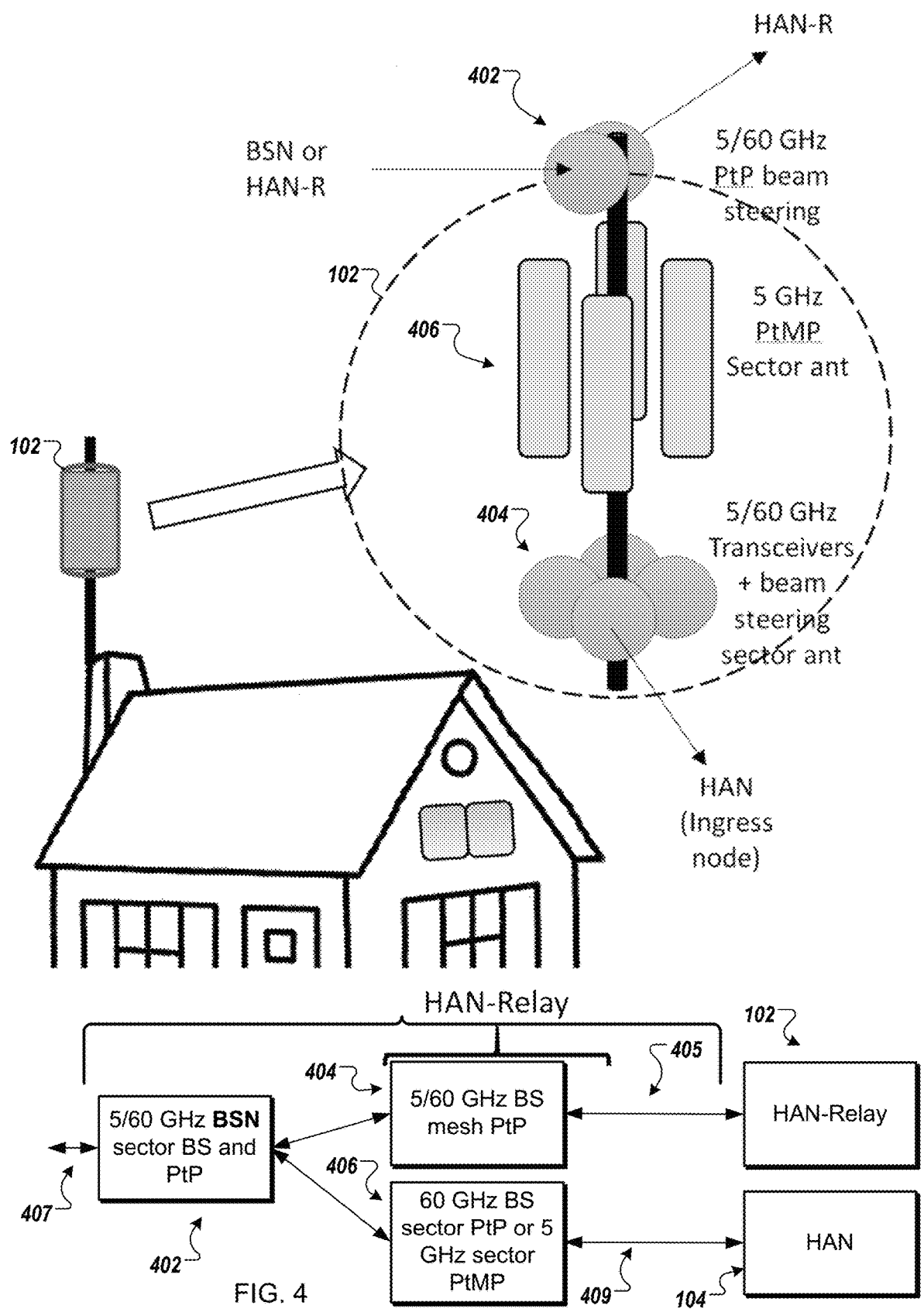
FIG. 4 illustrates a Home Access Node (HAN) relay device connected to a pole on a structure in the geographical area of the BSN according to one embodiment.

FIG. 4 illustrates a HAN relay device 102 connected to a pole on a structure in the geographical area of the BSN 106 according to one embodiment. As described above, the coverage area of the BSN device 106 can be split into four sectors using four sector high-gain antennas 202. Similarly, the HAN relay device 102 can include multiple sector high-gain antennas 402. These sector high-gain antennas 402 may be beam-steering antennas to establish PtP wireless connections with other hardware network devices in the WMN 100, such as the BSN device 106, another HAN relay device 102, or both. Alternatively, these sector high-gain antennas 402 may be sector fixed-beam antennas. In the depicted embodiment, there are two sector high-gain antennas 402, one of which can wirelessly connect to the BSN device 106 and the other of which can wirelessly connect to a second HAN relay device 102. Alternatively, one of the two sector high-gain antennas 402 can wirelessly connect to a second HAN relay device 102 and the other can wirelessly connect to a third HAN relay device 102. One of the two sector high-gain antennas 402 can connect with the BSN device 106 to form an ingress point of a first sub-mesh network of HAN relay devices 102 of the WMN 100. Another one of the two sector high-gain antennas 402 can connect with another HAN relay device 102 to relay data to another HAN relay device 102 that may not be connected to a BSN device 106.

The HAN relay device 102 also includes four beam-steering sector antennas 404 and four beam-steering sector antennas 404 (or optional four fixed-beam sector antennas).

In some instances, the four beam-steering sector antennas 404 are referred to as sector antennas since they are disposed to cover sectors of a smaller geographical area surrounding the HAN relay device 102. In one embodiment, the four beam-steering sector antennas 404 can be disposed 4 meters above the structure to provide LoS to other HAN devices 104 in the WMN 100. The sector high-gain antennas 402 can provide connections to other HAN relay devices 102 or BSN devices 106. Each of the HAN devices is individually connected to a building in a geographic area and each of the HAN devices can be an access point to provide Internet connectivity to a client device (e.g., client consumption device) located in a respective building to which the first HAN device is connected. The HAN relay device 102, or at least the antennas 402, 404, 406 of the HAN relay device 102, can be connected to a structure or to a pole connected to the structure. One of the four beam-steering sector antennas 404 provides data connections to HAN devices 104 within its corresponding sector using a data stream communicated via the wireless connections to the BSN device 106 (or with another one of the HAN relay devices 102) as described herein. Since the four beam-steering sector antennas 404 are beam-steering antennas, each of the four beam-steering sector antennas 404 can be used to connect to the HAN devices 104 over PtP wireless connections 409 to deliver data with optimal data connectivity. In one embodiment, the four beam-steering antennas 404 can radiate electromagnetic energy at 5 GHz or at 60 GHz. The four beam-steering antennas 404 can be coupled to corresponding radios in the HAN relay device 102 as described in more detail below with respect to FIG. 5. The radios may be bidirectional transceivers that transmit and receive wireless signals via the corresponding one of the four beam-steering antennas 404.

In another embodiment, the HAN relay device 102 also includes four fixed-beam sector antennas 406 to establish PtMP wireless connections 409 with one or more HAN devices 104. One of the four fixed-beam sector antennas 406 provides data connections to HAN devices 104 within its corresponding sector using a data stream communicated via the wireless connections to the BSN device 106 (or with another one of the HAN relay devices 102). Since the four fixed-beam sector antennas 406 are not beam-steering antennas, the fixed beam sector antennas 406 can be used to establish a PtMP wireless connection with one or more HAN devices 104 in the corresponding sector. The four fixed-beam sector antennas 406 may be optional for HAN relay devices 102. The four fixed-beam sector antennas 406 may permit the HAN relay device 102 to have a backup wireless connection with large data throughput, such as approximately 1 to 7 Gbps. In one embodiment, the four fixed-beam sector antennas 406 can radiate electromagnetic energy at 5 GHz. The four fixed-beam sector antennas 406 can be coupled to corresponding radios in the HAN relay device 102 as described in more detail below with respect to FIG. 5. The radios may be bidirectional transceivers that transmit and receive wireless signals via the corresponding one of the four fixed-beam sector antennas 406.

As depicted in FIG. 4, the HAN relay device 102 uses one of the four beam-steering antennas 404 to establish a PtP wireless connection 405 with the HAN relay device 102 (as an ingress node). The HAN relay device 102 can establish PtP wireless connections 407 with other HAN relay devices 102 or the BSN device 106 using the sector high-gain antennas 402.

Figure 5:
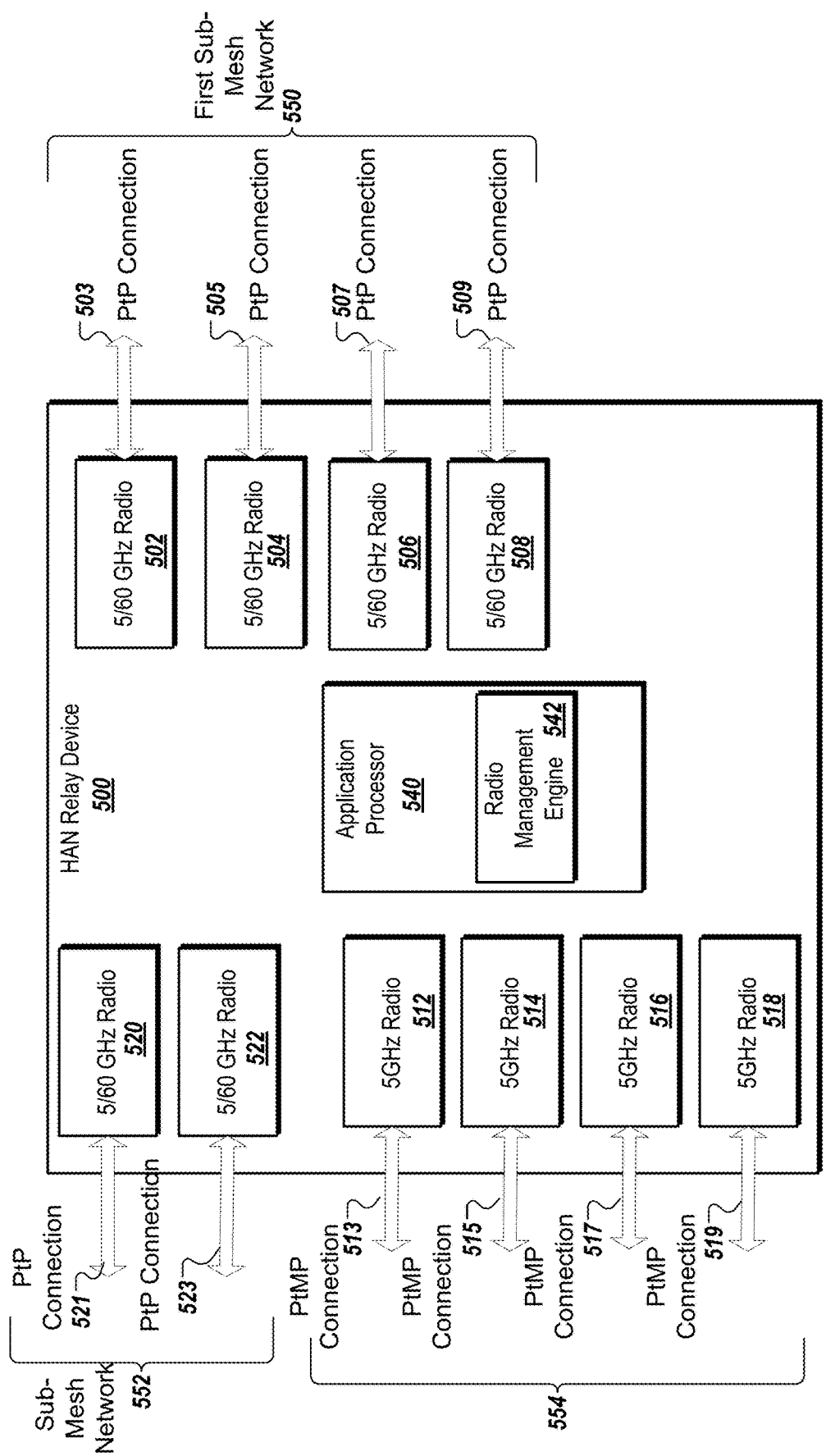
FIG. 5 is a block diagram of a HAN relay device with multiple radios and an application processor according to one embodiment.

FIG. 5 is a block diagram of the HAN relay device 500 with multiple radios and an application processor according to one embodiment. It should be noted that the HAN relay device 500 can be the HAN relay device 102 described above with respect to FIGS. 1-4. The HAN relay device 500 includes a first 5/60 GHz radio 502, a second 5/60 GHz radio 504, a third 5/60 GHz radio 506, a fourth 5/60 GHz radio 508, a fifth 5/60 GHz radio 510, and a sixth 5/60 GHz radio. The first 5/60 GHz radio 502 creates a first PtP wireless connection 503 between the HAN relay device 500 and a HAN device 104 (not illustrated in FIG. 5) in a first sector of the HAN relay device 500. The second 5/60 GHz radio 504 creates a second PtP wireless connection 505 between the HAN relay device 500 and a HAN device 104 (not illustrated) in a second sector of the HAN relay device 500. The third 5/60 GHz radio 506 creates a third PtP wireless connection 507 between the HAN relay device 500 and a HAN device 104 (not illustrated) in a third sector of the HAN relay device 500. The fourth 5/60 GHz radio 508 creates a fourth PtP wireless connection 509 between the HAN relay device 500 and a HAN device 104 (not illustrated) in a fourth sector of the HAN relay device 500. Each of the first, second, third, and fourth 5/60 GHz radios 502-508 is connected to a beam-steering antenna, such as one of the four beam-steering antennas 404 of FIG. 4. Each of the first, second, third, and fourth 5/60 GHz radios 502-508 provides a data connection to a HAN device 104 within its sector using a data stream received from the BSN device 106 (or from another HAN relay device 102). The first, second, third, and fourth 5/60 GHz radios 502-508 can be used to provide a sub-mesh network 550 of HAN devices 104 to provide access to devices within the respective structures to which the HAN devices 104 reside, as described herein. It should also be noted that multiple HAN relay devices 102 can be organized in a sub-mesh network 552 of HAN relay devices to provide backhaul to HAN devices 104 within the sub-mesh network 550.

The HAN relay device 500 also includes a ninth 5/60 GHz radio 520 and a tenth 5/60 GHz radio 522. The ninth 5/60 GHz radio 520 creates a PtP wireless connection 521 between the HAN relay device 500 and either a BSN device 106 or another HAN relay device 102 in the WMN 100. The tenth 5/60 GHz radio 5222 creates a PtP wireless connection 523 between the HAN relay device 500 and either a BSN device 106 or another HAN relay device 102 in the WMN 100. The ninth 5/60 GHz radio 520 and tenth 5/60 GHz radio 522 can be used to provide the sub-mesh network 552 of HAN devices 104 to provide backhaul to the HAN devices 104 within the sub-mesh network 550. In another embodiment, there may be additional radios used for PtP wireless connections to other HAN relay devices 102 or BSN devices 106, like PtP wireless connections 521, 523. Also, in other embodiments, more or less radios can be used for PtP wireless connections 503-509.

The HAN relay device 500 also includes a fifth 5 GHz radio 512, a sixth 5 GHz radio 514, a seventh 5 GHz radio 516, an eighth 5 GHz radio 518. The fifth 5 GHz radio 512 creates a first PtMP wireless connection 513 between the HAN relay device 500 and one or more of the HAN devices 104 (not illustrated in FIG. 5) in the first sector of the HAN relay device 500. The second 5 GHz radio 514 creates a second PtMP wireless connection 515 between the HAN relay device 500 and one or more of the HAN devices 104 (not illustrated in FIG. 5) in the second sector of the HAN relay device 500. The third 5 GHz radio 516 creates a third PtMP wireless connection 517 between the HAN relay device 500 and one or more of the HAN devices 104 (not illustrated in FIG. 5) in the third sector of the HAN relay device 500. The fourth 5 GHz radio 518 creates a fourth PtMP wireless connection 519 between the HAN relay device 500 and one or more of the HAN devices 104 (not illustrated in FIG. 5) in the fourth sector of the HAN relay device 500. Each of the first, second, third, and fourth 5 GHz radio 512-518 is connected to a fixed-beam antenna, such as one of the four fixed-beam antennas 406 of FIG. 4. Each of the first, second, third, and fourth 5 GHz radio 512-518 provides a data connection to a HAN device 104 within its sector using a data stream received from the BSN device 106 (or from another HAN relay device 102). The first, second, third, and fourth 5 GHz radios 512-518 can be used to provide backup wireless connections 554 to the wireless connections 503-509 of the sub-mesh network 550, as described herein.

In other embodiments, the HAN relay device 500 may include other radios for other types of wireless communications, such as a cellular radio to communicate using one of the cellular technologies. The cellular connection may be used to communicate with the network control service to manage the WMN 100 as described herein.

The HAN relay device 500 includes the application processor 540 to process data signals in connection with communicating with other network devices in a WMN. The application processor 540 is coupled to the radios 502-508, radios 512-518, and radios 520-522. In other embodiments, other processing devices may be used. The application processor 540 can execute various modules, such as a radio management engine 542 that is similar in operations of the radio management engine 342 described above with respect to FIG. 3.

In one embodiment, the application processor 540 processes data signals in connection with communicating with other network devices in a WMN, such as the HAN device 104. The application processor 540 may be coupled to a first radio (e.g., 520) that is coupled to a first beam-steering antenna, a second radio (e.g., 502) that is coupled to a second beam-steering antenna. The application processor 540 communicates data with the BSN device 106 (or another HAN relay device 102) over the PtP wireless connection 521 using the first radio 520 and communicate data with the HAN device 104 over the PtP wireless connection 503 using the second radio 502. The application processor 340 can also communicate additional data to a second HAN device 102 over another PtP wireless connection 505 using a third radio 504 and the corresponding beam-steering antenna.

In another embodiment, the HAN relay device 500 includes a first set of two 5/60 GHz radios. Each of the first set of two 5/60 GHz radios is coupled to a beam-steering antenna. Each of the first set of two 5/60 GHz radios establishes a PtP wireless connection over which the HAN relay device 500 communicates with a second HAN relay device in a first sub-mesh network of HAN relay devices in the WMN (referred to as HAN-R sub-mesh network). Alternatively, each of the first set of two 5/60 GHz radios establishes a PtP wireless connection with a BSN device. The HAN relay device 500 also includes a second set of four 5/60 GHz radios. Each of the second set of four 5/60 GHz radios is coupled to a beam-steering antenna in one of the four sectors. Each of the second set of four 5/60 GHz radios establishes a PtP wireless connection over which the HAN relay device 500 communicates with one of the HAN devices 104 in a second sub-mesh network in the WMN 100 (referred to as HAN sub-mesh network).

In a further embodiment, the HAN relay device 500 further includes a third set of four 5 GHz radios. Each of the third set of four 5 GHz radios is coupled to an antenna in one of the four sectors. Each of the third set of four 5 GHz radios establishes a PtMP wireless connection over which the HAN relay device 500 communicates with at least some of the HAN devices 104 in the second sub-mesh network of HAN devices in the WMN 100. The PtMP wireless connection may be a backup communication link for the PtP wireless connection.

In one embodiment, the radios 502-508 may be 60 GHz transceivers used to communicate with HAN devices 104 within corresponding sectors to initiate the second sub-mesh network of HAN devices. The radios 512-518 may be 5 GHz transceivers used to communicate with HAN devices within corresponding sectors to form PtMP sectors communication as back-up communication links for the second sub-mesh network (i.e., the 60 GHz mesh network).

In another embodiment, the BSN device 106 and BSN device 300 described above can also include the technology of the HAN relay device 102 and HAN relay device 500 described above to operate as a BSN/HAN relay device. In these embodiments, additional radios and antennas may be included in the same device. In another embodiment, the BSN device 106 can be located on a same structure as a HAN relay device 102. In such cases, the BSN device 106 (300) and the HAN relay device 102 (500) would include a transceiver to establish a wired connection between the two devices.

Figure 6:
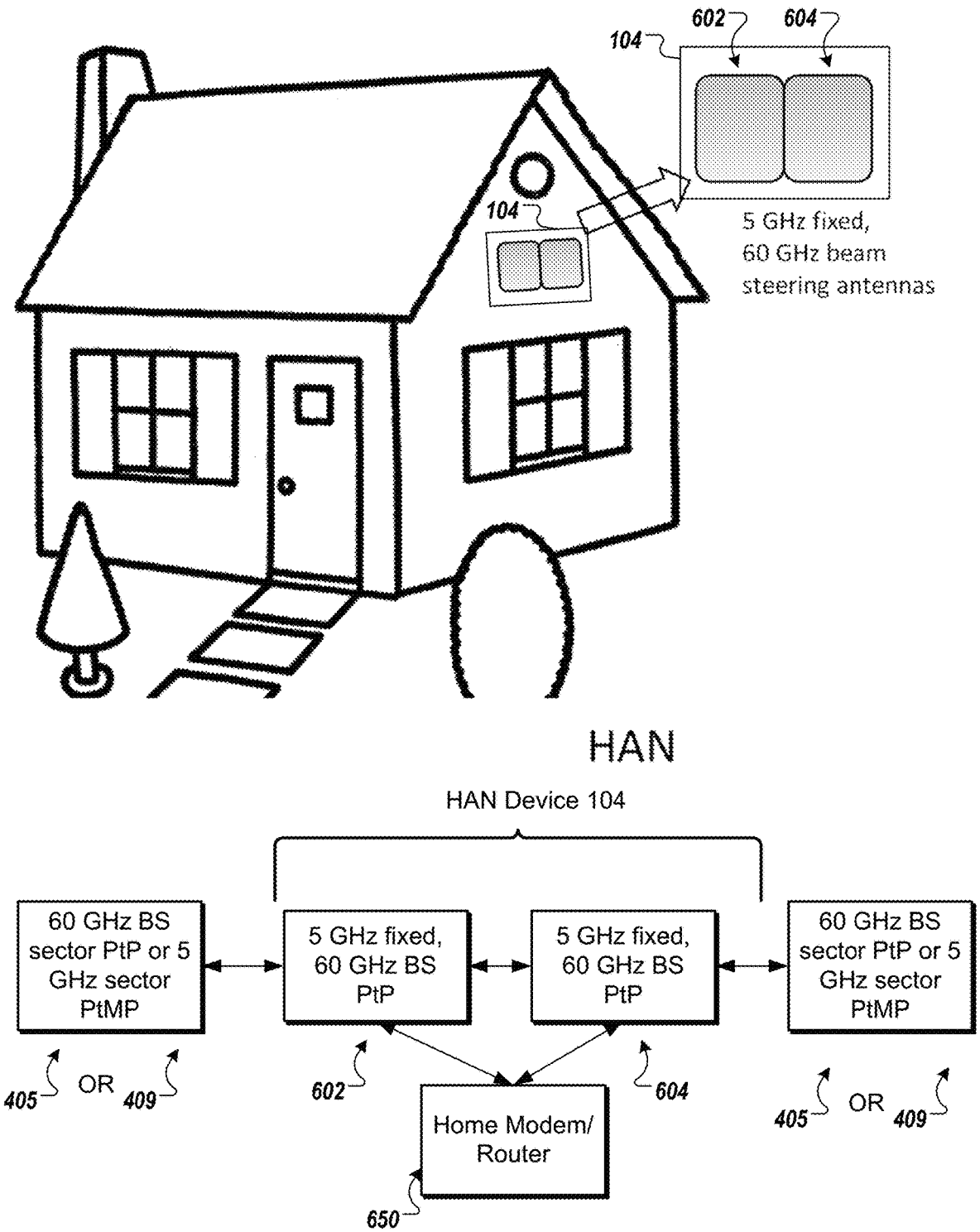
FIG. 6 illustrates a HAN device connected to an exterior of a structure in the geographical area of the BSN according to one embodiment.

FIG. 6 illustrates a HAN device 104 connected to an exterior of a structure in the geographical area of the BSN 106 according to one embodiment. As described above, the coverage area of the BSN device 106 can be split into four sectors using four sector high-gain antennas 202. Similarly, the HAN relay device 102 can be split into four sectors using four beam-steering antennas 404. In some instances, the four beam-steering sector antennas 404 are referred to as sector antennas since they are disposed to radiate electromagnetic energy to cover sectors of a smaller geographical area surrounding the HAN relay device 102. The HAN relay device 102 can also include the four fixed-beam antennas 406. The HAN device 104 includes two radios 602, 604, and each of the two radios is connected to both a 5 GHz fixed-beam antenna and a 60 GHz beam-steering antenna. In one embodiment, the 5 GHz fixed-beam antenna and the 60 GHz beam-steering antenna can be disposed on an exterior of a structure. The structure does not have to be the same structure upon which the HAN relay device 102 is disposed. The radio 602 can provide a data connection to one of the HAN relay devices 102 and the radio 604 can provide a data connection to another HAN device 104. Alternatively, the radio 604 can provide a data connection to one of the HAN relay devices 102 and the radio 602 can provide a data connection to another HAN device 104. These data connections can be via the beam-steering antennas or the fixed-beam antennas. The beam-steering antennas 404 can be used to connect to the HAN device 104 to the HAN relay device 102 to communicate data with optimal data connectivity. In one embodiment, the beam-steering antenna can radiate electromagnetic energy at 60 GHz. Alternatively, the beam-steering antenna can radiate electromagnetic energy at 5 GHz. The HAN device 104 can also have a wired connection or wireless connection to a device within the structure, such as a home modem/router 650. The radios 602, 604 may each be a bidirectional transceiver that transmit and receive wireless signals via the beam-steering antenna or the fixed-beam antenna.

The HAN device 104 can communicate with the HAN relay device 102 to form a mesh network using a beam-steering antenna and can provide Internet to a subscriber as an access point for the home modem/router 650.

Figure 7:
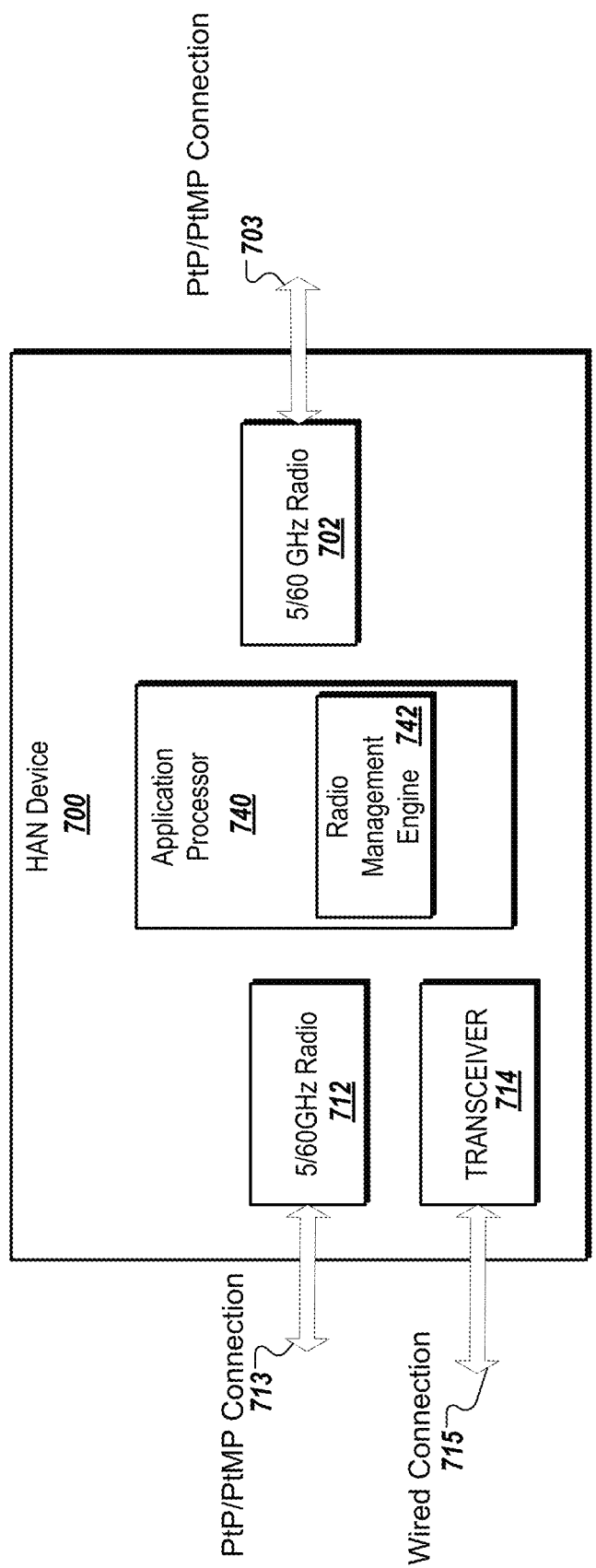
FIG. 7 is a block diagram of a HAN device with multiple radios and an application processor according to one embodiment.

FIG. 7 is a block diagram of a HAN device 700 with multiple radios and an application processor according to one embodiment. It should be noted that the HAN device 700 can be the HAN device 104 described above with respect to FIGS. 1-6. The HAN device 700 includes a 5/60 GHz radio 702 and a 5/60 GHz radio 712. The 5/60 GHz radio 702 creates a PtP or PtMP wireless connection 703 between the HAN device 700 and a HAN relay device 102 (not illustrated in FIG. 7). The 5/60 GHz radio 702 may be connected to a beam-steering antenna or a fixed-beam antenna as described herein. The 5/60 GHz radio 712 creates a PtP or PtMP wireless connection 713 between the HAN device 700 and a HAN device 104 (not illustrated in FIG. 7). Alternatively, the 5/60 GHz radio 712 creates a PtP or PtMP wireless connection 713 between the HAN device 700 and a HAN relay device 102 and the 5/60 GHz radio 702 creates a PtP or PtMP wireless connection 713 between the HAN device 700 and a HAN device 104 (not illustrated in FIG. 7). The HAN device 700 may be in any one of the four sectors of the HAN relay device. The 5/60 GHz radio 712 may be connected to a beam-steering antenna or a fixed-beam antenna. The HAN device 700 may be an access point to provide Internet connectivity to one or more client consumption devices located in or near a first building to which the HAN device 700 is connected. The HAN device 700 may include a transceiver 714 to create a wired connection 715 between the HAN device 700 and a device (home modem/router 650) located within the structure upon which the HAN device 700 is disposed. The wired connection 715 may be any type of wired connection. Alternatively, other connections can be made between the HAN device 700 and the home modem/router 650, such as an optical connection, a WLAN connection, a PAN connection, or the like. Alternatively, the HAN device 700 may include routing capability to distribute content to devices located within or near the structure upon which the HAN device 700 is disposed.

In another embodiment, there may be additional radios used for PtP wireless connections or PtP wireless connection. Also, in other embodiments, more or less radios can be used for PtP wireless connections and PtMP wireless connection. In other embodiments, the HAN device 700 may include other radios for other types of wireless communications, such as a cellular radio to communicate using one of the cellular technologies. The cellular connection may be used to communicate with the network control service to manage the WMN 100 as described herein.

The HAN device 700 includes the application processor 740 to process data signals in connection with communicating with other network devices in a WMN. The application processor 740 is coupled to the 60 GHz radio 702 and the 5 GHz radio 712. In other embodiments, other processing devices may be used. The application processor 540 can execute various modules, such as a radio management engine 742 that is similar in operations of the radio management engine 342 described above with respect to FIG. 3.

In one embodiment, the application processor 740 processes data signals in connection with communicating with other network devices in a WMN, such as the HAN relay device 102. The application processor 740 may be coupled to a first radio 702 (e.g., 5/60 GHz) that is coupled to a beam-steering antenna or a fixed-beam antenna and a second radio 712 (e.g., 5/60 GHz) that is coupled to a beam-steering antenna or a fixed-beam antenna. The application processor 740 communicates data with the HAN relay device 102 over the PtP or PtMP wireless connection 703 using the first radio 702 and communicates data with a HAN relay device 102 over the PtP PtMP wireless connection 713 using the second radio 712. In another embodiment, the application processor 740 communicates data with the HAN relay device 102 over the PtP or PtMP wireless connection 713 using the second radio 712 and communicates data with a HAN relay device 104 over the PtP PtMP wireless connection 703 using the first radio 702.

In one embodiment, the first radio 702 may be a 60 GHz transceiver used to communicate with HAN relay device 102 on the second sub-mesh network. The second radio 712 may be a 5 GHz transceiver used to communicate with HAN relay device 102 on the backup communication link for the second sub-mesh network (i.e., the 60 GHz mesh network).

FIG. 8 illustrates a WMN 800 in a PtMP star topology according to one embodiment. The WMN 800 includes a BSN device 806 that wirelessly connects to a router 808 of the broadband Internet infrastructure 108. The router 808 is coupled to an optical fiber connection 809 that provides access to the Internet for the WMN 800. In this embodiment, the BSN device 806 includes four sector antennas 810, each of the four sector antennas 810 corresponding to one of four sectors 812-818. The four sector antennas 810 may cover a geographic area represented by a circle having 200 meter radius. Each of the sectors 812-820 may be assigned a fixed-beam antenna to cover a quadrant and can establish a PtMP wireless connection with multiple HAN devices, each HAN device disposed at a structure within the sector. The four PtMP wireless connections by the four sector antennas 810 are also referred to as part of the backhaul in the WMN 800. The BSN device 806 also includes at least one antenna 820 that wirelessly connects to the router 808 of the broadband Internet infrastructure 108 via a PtP wireless connection 801. The PtP wireless connection 801 is made between beam-steering antennas (or fixed high-gain antennas), such as high-gain beam-steering antennas as described herein. The PtP wireless connection 801 is also referred to as part of the backhaul of the WMN 800. The four sector antennas 810 and the antenna 820 may use the 5 GHz unlicensed ISM band in a PtMP star configuration. This configuration of the WMN 800 may also be referred to as PtMP sector network.

Figure 9:
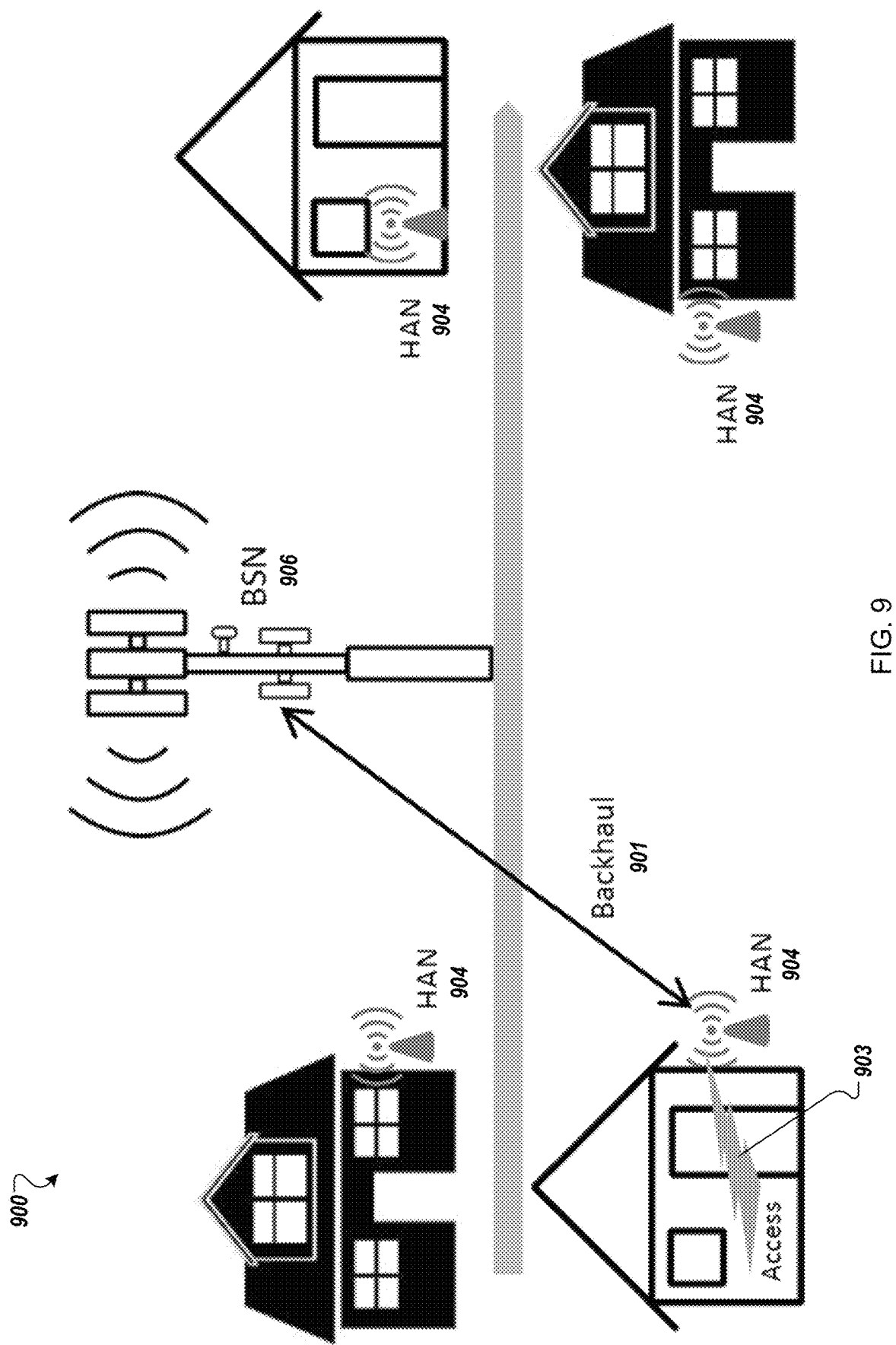
FIG. 9 illustrates a BSN device and HAN devices of a WMN in a PtMP star topology according to one embodiment.

For the PtMP star configuration, the BSN device 806 with an 8 meter high antenna can feed a HAN device. As shown in FIG. 8, the BSN device's coverage area is split into four quadrants and powered by the four high-gain sector antennas 810. The HAN device is a hardware device that may be similar to a cable modem or a satellite modem that connects to the BSN device 806 via an outdoor wireless link, referred to as BSN-to-HAN wireless link. The BSN-to-HAN wireless link may be a PtMP wireless link in that one sector antenna can communicate with multiple HAN devices. The HAN device provides broadband Internet access to a user's home. From a WMN customer perspective, the BSN-to-HAN wireless link is called "Backhaul," and the wireless link between the HAN device and the user home network is called "Access," such as illustrated in FIG. 9. The BSN device 806 may be professionally installed and mounted on a tower or light pole.

Figure 11:
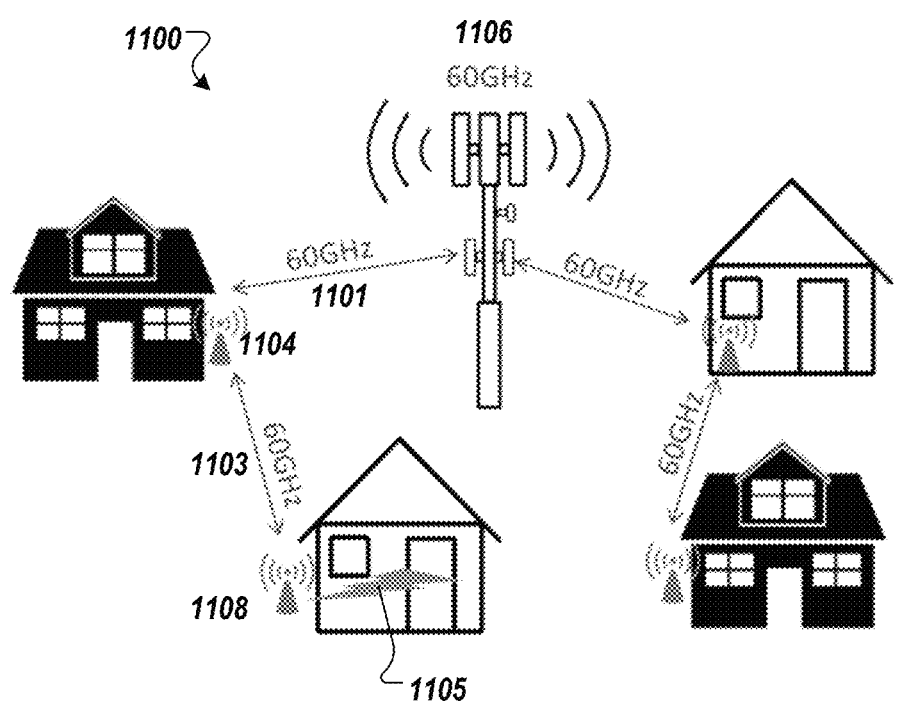
FIG. 11 illustrates a BSN device and HAN devices in a PtP mesh network topology according to one embodiment.
Figure 12:
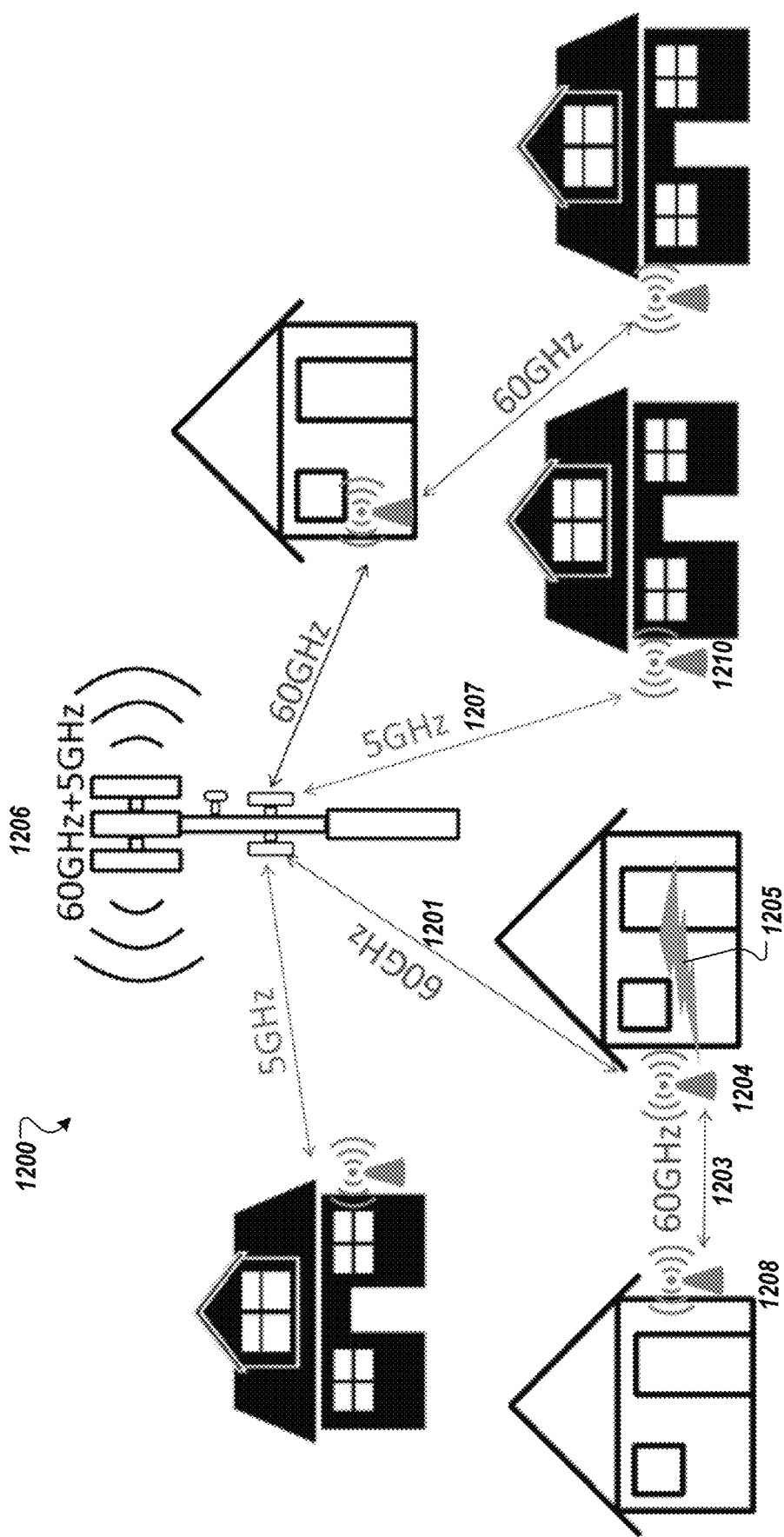
FIG. 12 illustrates a BSN device, HAN relay devices, and HAN devices in a hybrid network topology according to one embodiment.

Additional details of the PtMP star topology are set forth below with respect to FIG. 9. In other embodiments, the WMN may be setup in a PtP mesh network topology, as illustrated in FIGS. 10-11, as well as a hybrid topology as illustrated in FIG. 12. Alternatively, the HAN relay devices can be organized in a tessellated hexagon topology as illustrated and described with respect to FIGS. 16-19 below.

FIG. 9 illustrates a BSN device 906 and HAN devices 904 of a WMN 900 in a PtMP star topology according to one embodiment. This type of network topology uses 5 GHz for both backhaul and access. The BSN device 906 has four WLAN radios (e.g., radios using the Wi-Fi® 802.11ac technology). Each of the four WLAN radios supports 2×2 MIMO data streams and drives a high-gain sector antenna (e.g., 810). An antenna of the HAN device 904 points in the direction of a corresponding antenna at the BSN device 906. The antenna of the HAN device 904 may be self-installed, or installed by professional. The HAN device 904 may be installed at 2 meter height on an exterior of a structure, such as an outside wall of a building. As illustrated, the BSN device 906 communicates with one of the HAN devices 904 over a PtMP wireless connection 901, called "Backhaul." The HAN device 904 communicates with devices, which are located in or near the structure on which the HAN device 904 is installed, over a wireless or wired connection 903, called "Access."

The PtMP Star network supports both Line-of-Sight (LoS) and non-Line-of-Sight (NLoS) setups. To improve the backhaul wireless link quality and reliability, the antenna at the HAN device 904 can point in the general direction of the antenna of the BSN device 906 and be installed on an outside wall so that physical obstruction is limited to trees, wooden fences, exterior walls, or the like. A 5 GHz-only HAN device may be cheaper to manufacture, but the range and throughput of such a PtMP star network may be limited and may use a higher number of BSN device installations (e.g., 1 BSN for 10 homes), thus increasing overall network deployment costs.

FIG. 10 illustrates a WMN 1000 in a PtP mesh network topology according to one embodiment. The WMN 1000 is similar to the WMN 800 as noted by similar reference numbers, except the WMN 1000 includes a BSN device 1006 that operates in a PtP mesh network topology. Like the BSN device 806, the BSN device 1006 wireless connects to a router 808 of the broadband Internet infrastructure 108 using the antenna 820 as described above. Instead of four fixed-beam sector antennas, the BSN device 1006 includes four beam-steering sector antennas 1010 may cover the similar geographic area represented by the circle having 200 meter radius. Each of the sectors 812-820 may be assigned a beam-steering antenna to cover a quadrant and can establish a PtP wireless connection with a HAN device disposed at a structure within the corresponding sector. The four PtP wireless connections by the four beam-steering sector antennas 1010 are also referred to as part of the backhaul in the WMN 1000. The four beam-steering sector antennas 1010 may use the 60 GHz unlicensed millimeter wave band for "Backhaul," and HAN devices can use antennas with the 5 GHz ISM band for "Access" in a PtP configuration with a linear mesh. This configuration of the WMN 1000 may also be referred to as PtP linear mesh network.

For the PtP linear mesh configuration, the BSN device 1006 with an 8 meter high antenna can feed a HAN device. As shown in FIG. 10, the BSN device's coverage area is split into four quadrants and powered by the four beam-steering sector antennas 1010. The HAN device is a hardware device that may be similar to a cable modem or a satellite modem that connects to the BSN device 1006 via an outdoor wireless link, referred to as BSN-to-HAN wireless link. The BSN-to-HAN wireless link may be a PtP wireless link in that one sector antenna can communicate with one of the multiple HAN devices. The HAN device provides broadband Internet access to a user's home. From a WMN customer perspective, the BSN-to-HAN wireless link is called "Backhaul," and the wireless link between the HAN device and the user home network is called "Access," such as illustrated in FIG. 11. The BSN device 1006 may be professionally installed and mounted on a tower or light pole.

Additional details of the PtP linear mesh topology are set forth below with respect to FIG. 11. Alternatively, the WMN may be setup in a hybrid topology as illustrated in FIG. 12.

FIG. 11 illustrates a BSN device and HAN devices in a PtP mesh network topology according to one embodiment. This type of network topology uses 60 GHz for backhaul and 5 GHz for access. The BSN device 1106 four WLAN radios supports 2×2 MIMO data streams and drives a high-gain beam-steering sector antenna (e.g., 1010). For this type of a network, the BSN-HAN backhaul link should be LoS. The BSN device 1106 communicates with a first HAN device 1104 of a first structure (first home), and then the first HAN device 1104 can communicate with a second HAN device 1108 as a next hop, forming a PtP mesh network. The BSN device 1106 communicates with the first HAN device 1104 over a first PtP wireless connection 1101 and the first HAN device 1104 communicates with the second HAN device 1108 over a second PtP wireless connection 1103. The first PtP wireless connection 1101 and second PtP wireless connection 1103 are the "Backhaul" of the mesh network. The second HAN device 1108 communicates with devices inside or near the second HAN device 1108 over a wired or wireless connection 1105, called "Access." The first structure has a LoS between the BSN device 1106 and the first HAN device 1104 with the antenna of the HAN device 1104 pointing at the antenna of the BSN device 1106. The second structure does not need LoS to the BSN device 1106, but should have LoS to the first structure. For example, the second structure may not be in the same row or same side of the street as the first structure, but may have LoS to the first structure, such as across the street. A linear mesh is thus formed in a zigzag fashion. In one embodiment, an installation of the HAN device may include installing the box inside the house and installing an antenna at a 2 m height on an outside wall of the structure.

A 60 GHz-only HAN device may be more expensive, but the throughput of such a PtP Mesh network is much higher. In addition, the mesh network may use a lower number of BSN device installations (e.g., 1 BSN device for 100 HAN devices), thus, reducing overall network deployment cost. It should be noted that the number of hops needed to cover structures (e.g., homes) that do not have LoS to the BSN device 1106 (or a neighbor HAN) might limit the scale of the deployment. Also, a high number of next hops may affect the latency and have an impact of quality of service (QoS) of the mesh network. Alternatively, the WMN may be setup in a hybrid topology as illustrated in FIG. 12.

FIG. 12 illustrates a BSN device, HAN relay devices, and HAN devices in a hybrid network topology according to one embodiment. This type of network topology uses 60 GHz and 5 GHz for backhaul using the BSN device 1206. Depending on the type of neighborhood, the BSN device 1206 can use either combination of 5 GHz or 60 GHz wireless links to provide reliable broadband Internet coverage to a home. The BSN device 1206 includes both 5 GHz and 60 GHz radios. In other embodiments, a spectrum in any of the cellular bands can be used if licensed. The radio can be added to support this spectrum.

In one embodiment, the BSN device 1206 includes four WLAN radios that each supports 2×2 MIMO data streams and drives a high-gain beam-steering sector antenna (e.g., 1010). For this type of a network, the BSN-HAN backhaul link should be LoS. The BSN device 1206 communicates with a first HAN device 1204 of a first structure (first home) over a first PtP wireless connection 1201, and then the first HAN device 1204 can communicate with a second HAN device 1208 as a next hop over a second PtP wireless connection 1203, forming a PtP mesh network. The first PtP wireless connection 1201 and second PtP wireless connection 1203 are the "Backhaul" of the mesh network. The second HAN device 1208 communicates with devices inside or near the second HAN device 1208 over a wired or wireless connection 1205, called "Access." Similarly, the first HAN device 1204 communicates with devices in side or near the first HAN device 104 over a wired or wireless connection, called "Access." The first structure has a LoS between the BSN device 1206 and the first HAN device 1204 with the antenna of the HAN device 1204 pointing at the antenna of the BSN device 1206. The second structure does not need LoS to the BSN device 1206, but should have LoS to the first structure. The BSN device 1206 can also communicate with a third HAN device 1210 over a PtMP wireless connection 1207. The BSN device 1206 can communicate with the third HAN device 1210 using the 5 GHz ISM band, instead of the 60 GHz using for the PtP wireless connection 1201.

A hybrid network may address the LoS-only restriction of 60 GHz links by using an NLoS 5 GHz link to the next hop in the mesh network. Such a hybrid deployment also may overcome a range limitation of a 5 GHz-only network, and reduces the number of hops in a 60 GHz-only network.

In the following description, network setup and scaling and cost to deploy an example WMN is described. Various cities across the U.S. have programs to bring broadband connectivity to its residents and have started installing fiber under major streets. The fiber network does not directly connect to homes, but is available to ISPs that want to take advantage of the infrastructure to build neighborhood wireless networks. Cities also allow wireless service providers to install WLAN equipment on street light poles (for power) and tap into the fiber network infrastructure. This is typically done via a permit and approval process by the city council. For example, in the Bay Area, cities that provide such a public infrastructure to set up a wireless service include Santa Clara, Palo Alto and San Jose. For cities that do not provide such a public infrastructure service, the BSN devices can be installed on a tower. The connection from the BSN device back to web services can be via a local fiber loop or a second PtP wireless link.

For one example network, a neighborhood in the city of Santa Clara, Calif., can be modeled as a 1600-home neighborhood in a 40×40 grid (Manhattan layout). The distance between homes is 30-40 meters for an overall coverage area of 1.5-2.5 sq.km. For such a build-out, a WMN can be deployed. The BSN device in the WMN is the central ingress/egress point for the entire network. The BSN device has sufficient computing and storage capacity and operates as a master switch, managing the network and the traffic flow, with the fiber backhaul to the network control service as described herein. The network control service may be similar to a packet gateway in a cellular network. As the BSN device is an expensive piece of equipment, the number of BSN device installations should be considered. So, as part of network planning, a tiered hierarchy can be used to manage connectivity services for the entire neighborhood. In a lower tier than the BSN, a lower-cost variant of the BSN device can be used that has multiple radios, both 5 GHz and 60 GHz radios, but without the fiber backhaul to the hosted network control service. This hardware network device is referred to herein as HAN relay device and may have lower computing and storage capacity than the BSN device. The HAN relay device permits the WMN to be scaled. The network topology is illustrated and described with respect to FIG. 13.

Figure 13:
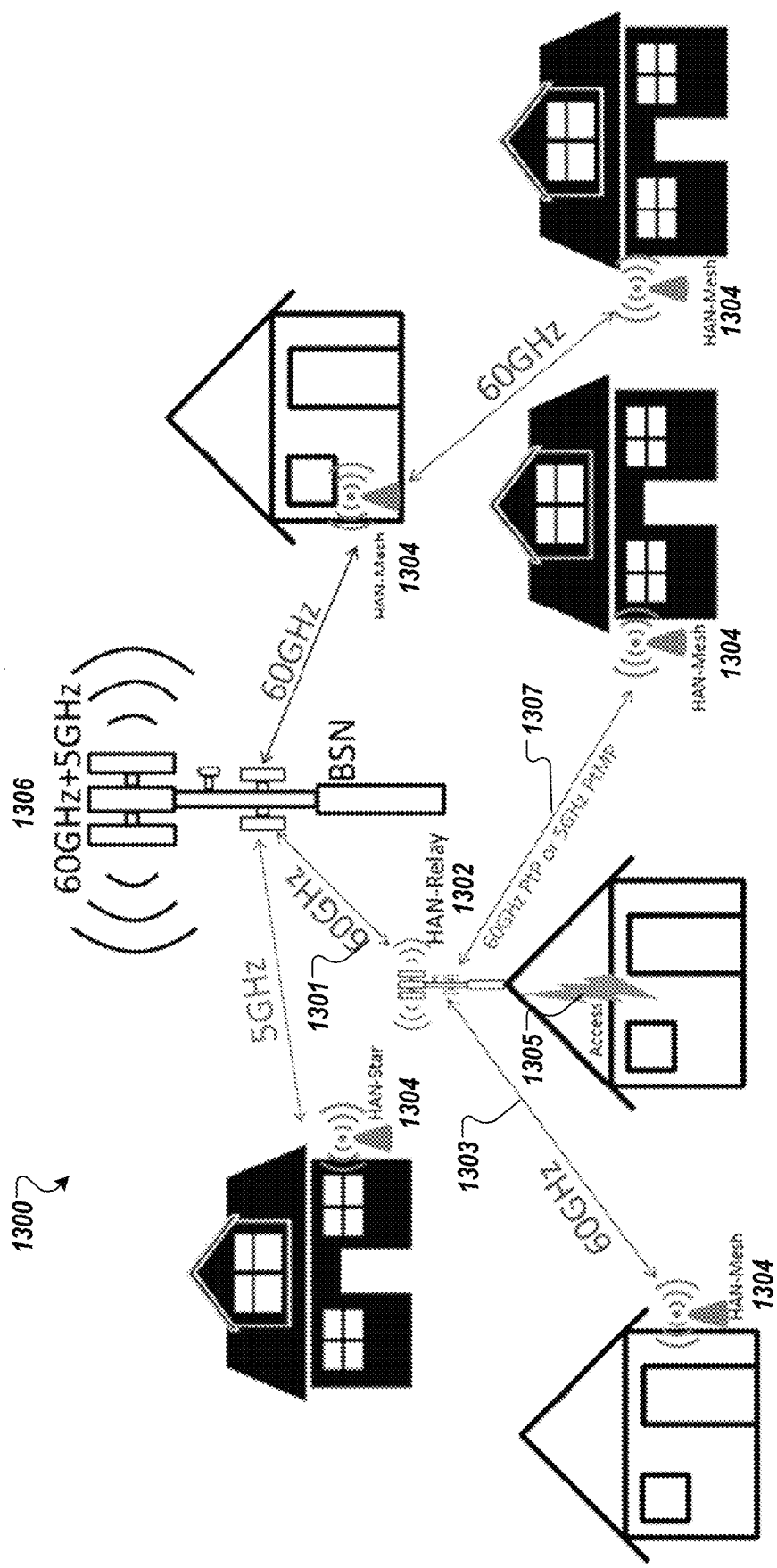
FIG. 13 illustrates a WMN deployment according to another embodiment.

FIG. 13 illustrates a WMN 1300 deployment according to another embodiment. The WMN 1300 uses a hybrid network topology as described herein. The WMN 1300 includes a HAN relay device 1302, multiple HAN devices 1304, and a BSN device 1306. This type of network topology uses 60 GHz and 5 GHz for backhaul using the BSN device 1206. Depending on the type of neighborhood, the BSN device 1206 can use either combination of 5 GHz or 60 GHz wireless links to provide reliable broadband Internet coverage to a home. The BSN device 1206 includes both 5 GHz and 60 GHz radios. The BSN device 1306 includes four WLAN radios that each supports 2×2 MIMO data streams and drives a high-gain beam-steering sector antenna (e.g., 1010). The BSN device 1206 communicates with a HAN relay device 1302 of a first structure (first home) over a first PtP wireless connection 1301 (e.g., 60 GHz). The HAN relay device 1302 has four WLAN radios (e.g., WLAN radios using the Wi-Fi® 802.11ad technology), which each drive one of four high-gain beam-steering sector antennas. The HAN relay device 1302 also includes four WLAN radios (e.g., WLAN radios using the Wi-Fi® 802.11ac technology), which each drives one of four high-gain antennas. These antennas can be considered fixed-beam antennas. The HAN relay device 1302 can also be professionally installed on an 8 m height. An ideal location may be a city building, a light pole in the neighborhood, even on a rooftop of a structure, if permitted. In this network topology, the HAN relay device 1302 takes on two forms: a HAN-Star and a Han-Mesh. The HAN-Star supports a PtMP Star (5 GHz only) configuration, and the Han-Mesh supports a hybrid (PtMP Star and PtP Mesh) configuration. The HAN devices 1304 can be self-installed with the antenna at a 2 m height on an outside wall.

The HAN relay device 1302 can communicate with a second HAN device 1304 as a next hop over a second PtP wireless connection 1303, forming a PtP mesh network. The HAN relay device 1302 can also communicate with devices inside or near the second HAN device 1208 over a wired or wireless connection 1305, called "Access." The HAN relay device 1302 can communicate with a third HAN device 1304 as a next hop over a wireless connection 1307. The wireless connection 1307 can be either a third PtP wireless connection (e.g., 60 GHz) or a PtMP wireless connection (e.g., 5 GHz).

Figure 14:
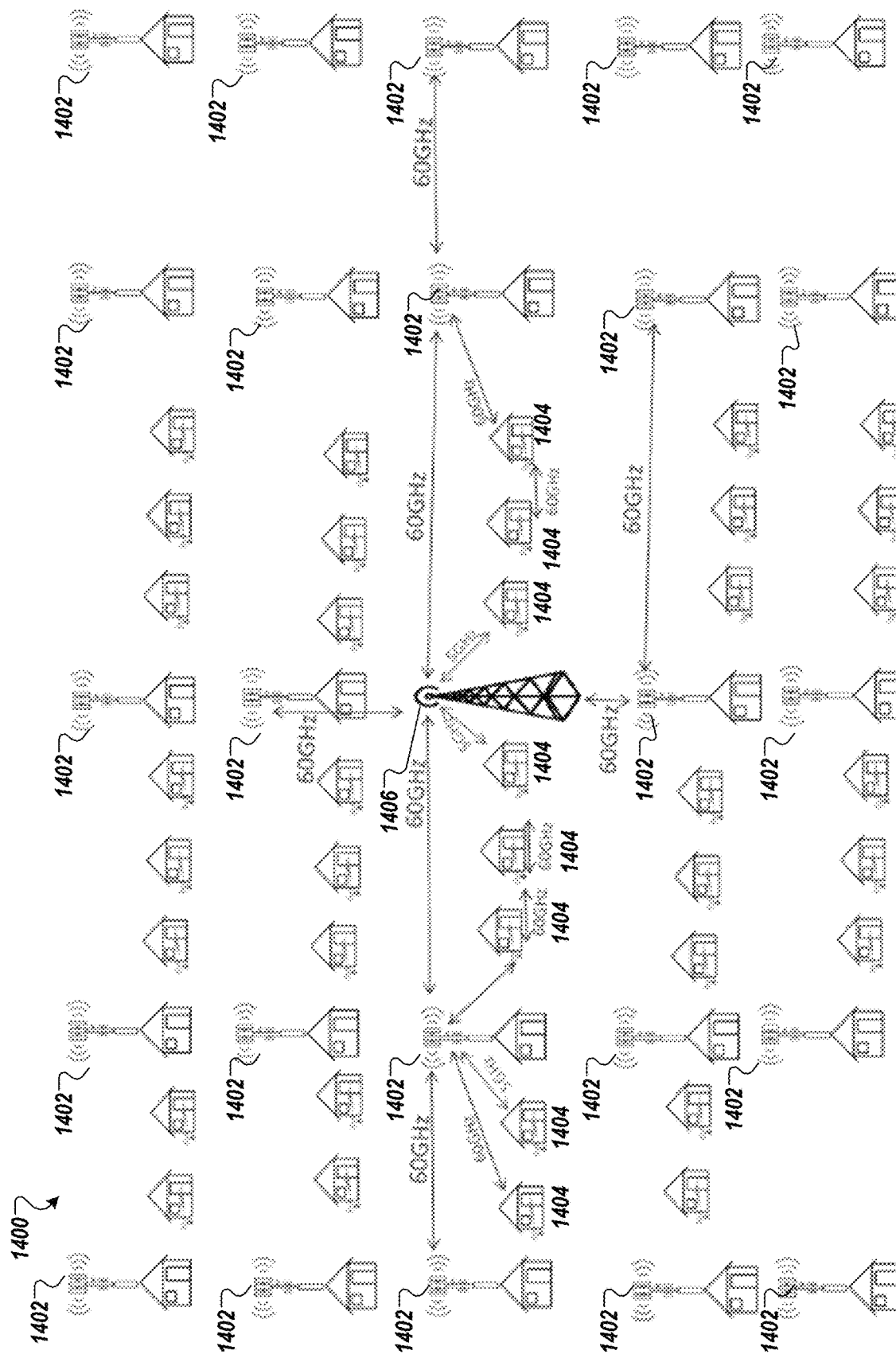
FIG. 14 illustrates a scaled WMN according to one embodiment.

Some modeling and simulation for a 1600-home neighborhood has shown that one BSN device to 24 HAN relay devices can be used to scale the WMN with acceptable network performance, such as illustrated in FIG. 14.

FIG. 14 illustrates a scaled WMN 1400 according to one embodiment. The scaled WMN 1400 includes twenty-five HAN relay devices 1402, multiple HAN devices 1404 (potentially 64 HAN devices per HAN relay device, one HAN device per home), and one BSN device 1406.

The HAN relay devices form a mesh and connect to the BSN device. Not all HAN relay devices need a LoS connection to the BSN device. Each BSN sector may support six HAN relay devices and each HAN relay sector can provide connectivity up to 16 homes. In this network configuration, the maximum number of hops from a BSN device to a HAN relay is 6, and the maximum number of hops from a HAN relay device to a HAN device is 16. Alternatively, other numbers of the respective devices may be used in other configurations of the WMN. As wireless is a shared medium, data injected into the overall network is shared among all homes served by a BSN device. A data contention ratio (CR) of 10:1 can be used so that data injected into the network is 1/10 the total home data rate within the sector. Using the CR value for the 1600-home example, such a network can support TCP data ranges of 50 Mbps to each home connecting via a 5 GHz link, and 100 Mbps to each home connecting via a 60 GHz link. The TCP data rate is 65% of the physical data rate. In theory, it is possible to double the per home data rates by adding a second BSN device, which double the capacity of the WMN.

In an ideal condition that does not account for 20 dB of foliage loss at 5.8 GHz band, the WMN can deliver data at more than 20 Mbps/house (TCP data rate per house) at 10:1 contention radio while keeping the percentage of houses hosting BSN devices to under 3%. In a non-ideal condition that includes 20 dB foliage loss (for a 10 m wide foliage at 5.8 GHz), the TCP data rate per house at 10:1 contention ratio drops to 4.7 Mbps while the percentage of houses hosting a BSN device increased to 9% for a single data stream case. For the maximum available data injection case, such as using dual data streams and dual 80 MHz channels, the percentage of houses hosting a BSN device increases to 18% while the TCP data rate per house at 10:1 contention ratio equals the injection data rate of 85 Mbps. To overcome foliage loss, a secondary AP location may be added to improve or avoid foliage blockage in its signal path. Alternatively, an optional or additional mesh link may be used between the neighboring houses to relay the signal to the house affected by the foliage problem. This solution may use a beam-steering antenna to be used for home nodes; when a home node detects poor signal level then its antenna beam will be redirected from pointing to the BSN device to a neighbor's HAN device, providing the strongest signal using a beam-steering antennas. (Hybrid PtMP and Mesh network). Alternatively, the impacted antenna could be moved to clear the foliage.

A linear PtP mesh network may use for a 60 GHz network since FCC mandates usage of PtP link for the 60 GHz band. In this PtP mesh network, the analysis showed that the maximum number of houses that can be connected on a single mesh injection node may not be limited by the maximum injection data rate but limited by the accumulated latency after n number of hops. The maximum number of hops with each mesh node consuming 20 Mbps/house data rate at 10:1 contention ratio yields more than 400 hops.

Since DIY installation of CPE transceiver (antennas of the HAN device 104) would entail mounting CPE transceivers on an external wall of a house, the installation may require complex electrical or carpentry work. To avoid customer performing complex electrical and carpentry work, Ethernet on power lines can be used to communicate ISP data from the HAN device 104 to inside the home. In another embodiment, an optical coupling through a window pane may be used.

Figure 15:
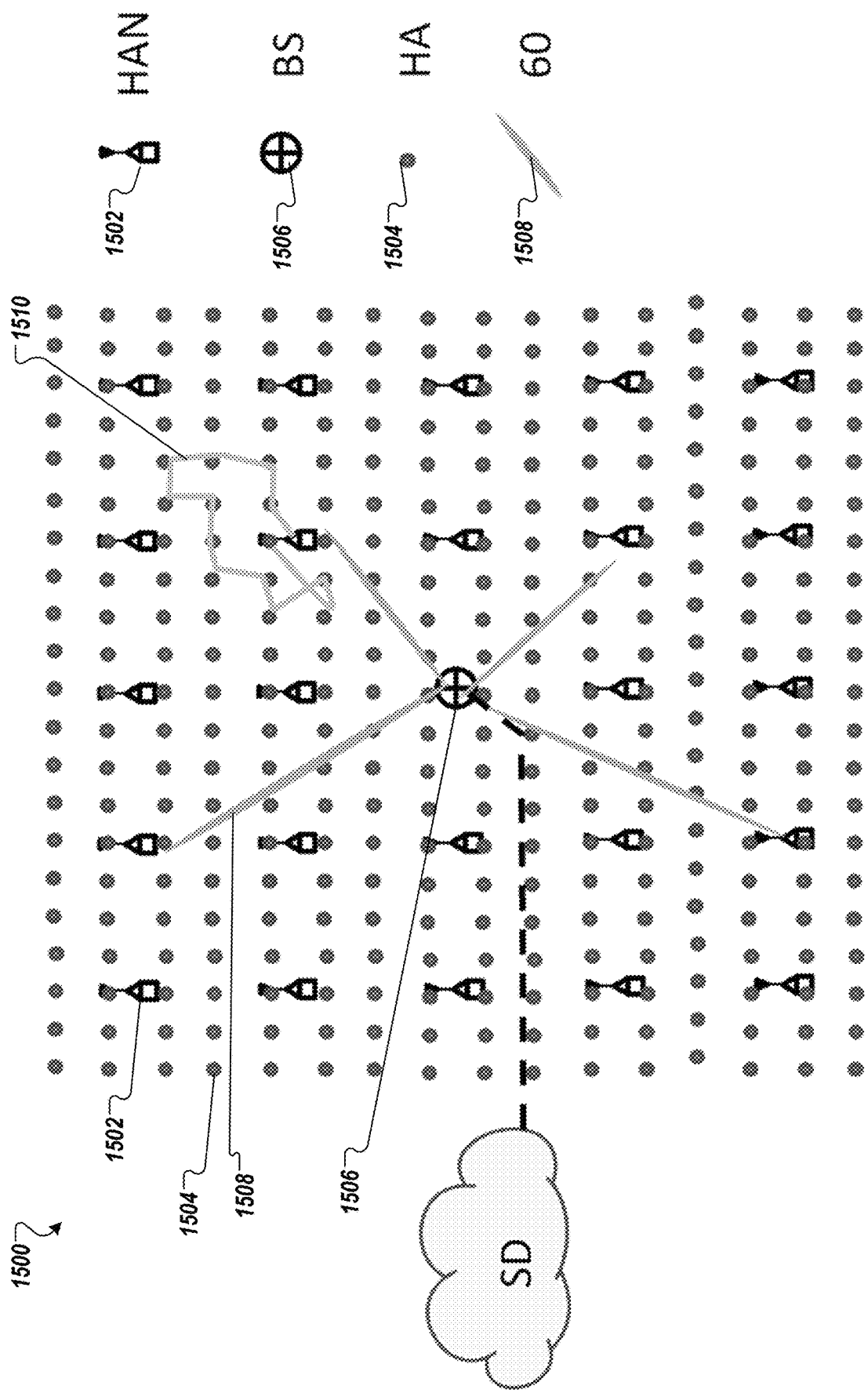
FIG. 15 is a network diagram of a WMN as a simplified single cell according to one embodiment.

FIG. 15 is a network diagram of a WMN 1500 as a simplified single cell according to one embodiment. The WMN 1500 includes multiple HAN relay devices 1502, multiple HAN devices 1504, and a BSN device 1506. The BSN device 1506 can wireless communicate with HAN relay devices 1502, such as over PtP wireless connections 1508. Any one of the HAN relay devices 1502 can communicate with a first HAN device 1504, which communicates with another HAN device 1504 and so on in a linear mesh network 1510.

In one embodiment, a WMN operating in a 60 GHz mesh network operation can include multiple network components: a BSN device, a HAN relay device, and a HAN device. A BSN has multiple 60 GHz transceivers with steerable antennas. In this example, four such transceivers cover the area surrounding the BSN tower forming the four sectors. A HAN relay is a node that forms a mesh network between the HAN relays within each sector. It also initiates a sub-mesh network connecting a HAN relay device to HAN devices within its surrounding area based on the associated connectivity parameters: data rate and link budgets, latency, etc. A HAN is a home node mounted on each subscriber's home providing internet connectivity to the subscriber. It also is used to provide the final mesh link connecting neighboring HAN devices.

Alternatively, the HAN relay devices can be organized in other topologies, such as a tessellated hexagon topology as illustrated and described with respect to FIGS. 16-24.

Figure 16:
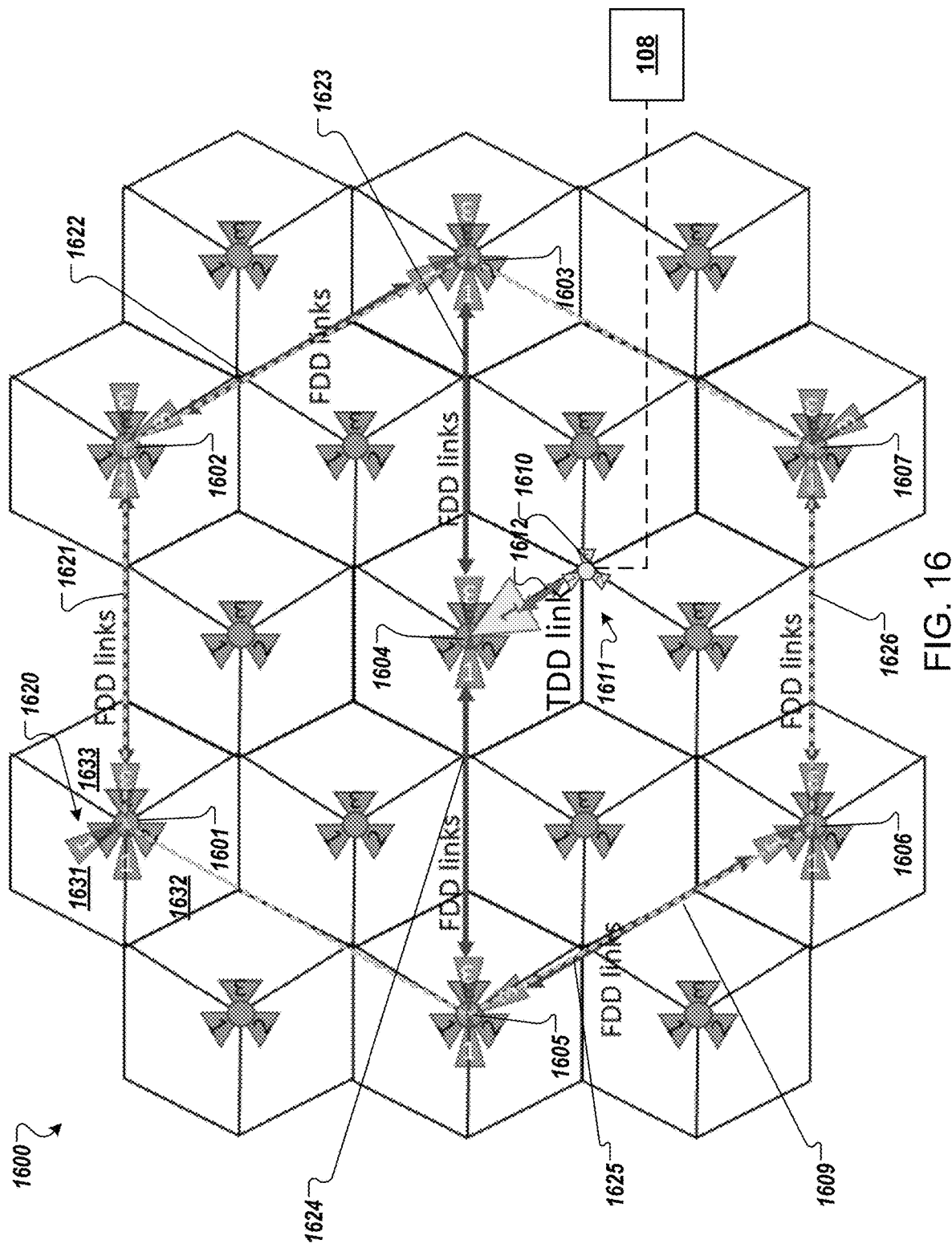
FIG. 16 illustrates a WMN with HAN relay devices organized in a tessellated hexagon topology according to one embodiment.

FIG. 16 illustrates a WMN 1600 with HAN relay devices organized in a tessellated hexagon topology according to one embodiment. The WMN 1600 includes a BSN device 1610 that connects (wired or wireless) the broadband Internet infrastructure 108 (e.g., router coupled to an optical fiber connection that provides access to the Internet for the WMN 1600 as described herein) and three linear sub-mesh networks. A first linear sub-mesh network 1609 is illustrated in FIG. 16 and a second linear sub-mesh network and a third linear sub-mesh network are illustrated and described below with respect to FIG. 18. The first linear sub-mesh network 1609 includes a first HAN relay device 1601, a second HAN relay device 1602, a third HAN relay device 1603, a fourth HAN relay device 1604, a fifth HAN relay device 1605, a sixth HAN relay device 1606, and a seventh HAN relay device 1607. The HAN relay devices may be organized in the first linear sub-mesh network 1609 with a first deployment layout having an inverted S-shape (or alternatively an S-shape). Each of the HAN relay devices 1601-1607 can establish one or more FDD links between itself and at least one other HAN relay device. The fourth HAN relay device 1604 (or the BSN device 1610) can establish a time-division duplex (TDD) link (wireless connection 1612) over which the fourth HAN relay device 1604 communicates with the BSN device 1610. In other embodiments, a TDD link can be establish between the BSN device 1610 and any one or more of the HAN relay devices 1601-1607.

Figure 18:
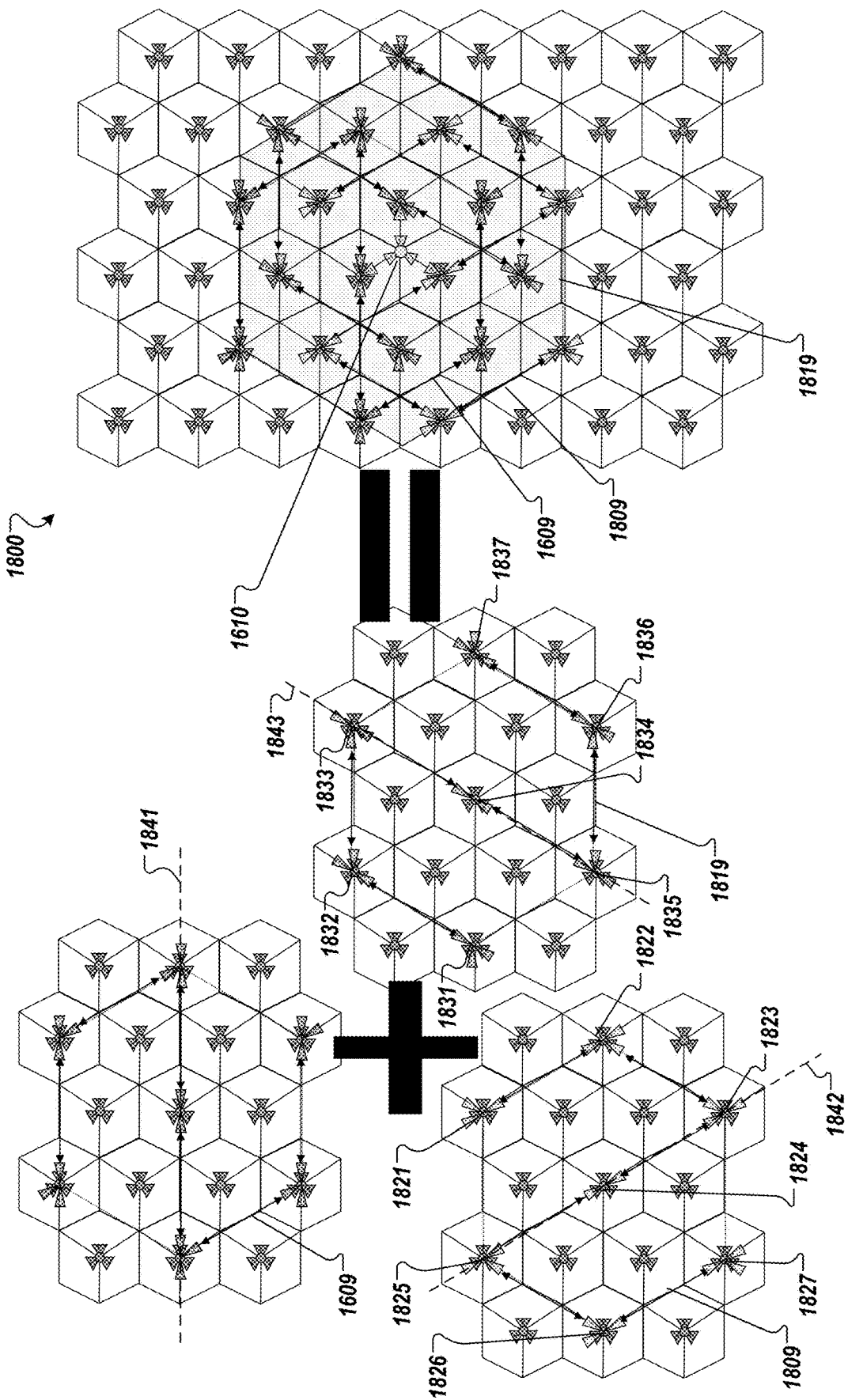
FIG. 18 illustrates a WMN with three independent linear sub-mesh networks connected to a BSN device according to one embodiment.

In the depicted embodiment, the first deployment layout includes a first hexagon pattern (illustrated with dashed lines) including six vertices and a center point at which individual ones the HAN relay devices 1601-1607 are positioned. In particular, the first HAN relay device 1601 is positioned (or substantially positioned) at a first vertex of the hexagon pattern, the second HAN relay device 1602 is positioned at a second vertex of the hexagon pattern, the third HAN relay device 1603 is positioned at a third vertex of the hexagon pattern, the fourth HAN relay device 1604 is positioned at a center point in the hexagon pattern, the fifth HAN relay device 1605 is positioned at a fourth vertex of the hexagon pattern, the sixth HAN relay device 1606 is positioned at a fifth vertex of the hexagon pattern; and the seventh HAN relay device 1607 is positioned at a sixth vertex of the hexagon pattern. In one embodiment, the first linear sub-mesh network 1609 includes a first path of links in a first direction, i.e., starting from a first HAN relay device and ending at a seventh HAN relay device, and a second path of links in a second direction, i.e., starting from the seventh HAN relay device and ending at the first HAN relay device. In the depicted embodiment, the first linear sub-mesh network 1609 includes: a first FDD link 1621 over which the first HAN relay device 1601 and the second HAN relay device 1602 communicate; a second FDD link 1622 over which the second HAN relay device 1602 and the third HAN relay device 1603 communicate; a third FDD link 1623 over which the third HAN relay device 1603 and the fourth HAN relay device 1604 communicate; a fourth FDD link 1624 over which the fourth HAN relay device 1604 and the fifth HAN relay device 1605 communicate; a fifth FDD link 1625 over which the fifth HAN relay device 1605 and the sixth HAN relay device 1606 communicate; and a sixth FDD link 1626 over which the sixth HAN relay device 1606 and the seventh HAN relay device 1607 communicate. Alternatively, other FDD links can be established between the HAN relay devices 1601-1607 to form an S-shape pattern or the like. In another embodiment, the other HAN relay devices illustrated in FIG. 16 are part of other linear sub-mesh networks that are offset and rotated from the first linear sub-mesh network 1609 as described below with respect to FIG. 18. As illustrated in FIG. 18, there are two sides of the hexagon pattern where two HAN relay devices at adjoining vertices do not communicate directly, causing two openings along the perimeter of the hexagon. These two open sides will similarly rotate from the first hexagon pattern to the second hexagon pattern or to the third hexagon pattern. It should be noted that the description herein describes hexagon patterns, vertices, and the like. However, actual deployment of these network devices may not be exact hexagon shapes as illustrated.

In one embodiment, any of the HAN relay devices 1601-1607 in the first linear sub-mesh network 1609 may include: a first radio to communicate with the BSN device 1610; a second radio to communicate with another HAN relay device in the first linear sub-mesh network in a first direction; a third radio to communicate with another HAN relay device in the first linear sub-mesh network in a second direction. In one embodiment, the first and second directions are opposite directions at 180 degrees, such as for the fourth HAN relay device 1604. In other embodiments, an angle between the first direction and the second direction is at least 50 degrees, such as for the third HAN relay device 1603. In a further embodiment, any of the HAN relay devices 1601-1607 in the first linear sub-mesh network 1609 may also include a fourth radio to communicate with a first HAN device (not illustrated in FIG. 16) located in a first sector 1631, a fifth radio to communicate with a second HAN device (not illustrated in FIG. 16) located in a second sector 1632, and a sixth radio to communicate with a third HAN device (not illustrated in FIG. 16) located in a third sector 1633. Each of the first, second, and third HAN devices may be an access point to provide Internet connectivity to a client consumption device connected to the respective HAN device. In one embodiment, the three sectors 1631, 1632, 1633 are diamond shapes that form a hexagon surrounding the respective HAN relay device. The hexagons of adjacent HAN relay devices form a tessellation pattern, such as a honeycomb tessellation of hexagons as illustrated in FIG. 16. The tessellation patterns may be replicated to extend the linear sub-mesh networks as described herein. In various embodiments, three antennas are oriented to be 120 degrees apart. Also, the FDD links are 180 degrees apart in some cases and maybe as little as 60 degrees apart (e.g., FDD links 1622 and FDD links 1623). In many cases having the angle be 45 degrees or greater helps reduce interference between the FDD links. In another embodiment, there may be redundancy paths created by unused radios of the mesh network device. For example, in the case of an outage of one of the mesh network device, a source mesh network device can communicate with a destination mesh network device over a redundancy path using any unused radios or channels to communicate directly or indirectly.

In the depicted embodiment, the BSN device 1610 includes three sector antennas 1611, each of the three sector antennas 1611 corresponding to one of the three linear sub-mesh networks as described in more detail below. The three sector antennas 1611 may cover a geographic area represented by a tessellated pattern of hexagons (see FIG. 18 for three linear sub-mesh networks combined). Only a first linear sub-mesh network 1609 is illustrated in FIG. 16, but each of the three linear sub-mesh networks may be assigned to one of three fixed-beam antennas (sector antennas 1611) of the BSN device 1610 and the BSN device 1610 (or the HAN relay device) can establish a wireless connection 1612 between the BSN device 1610 and the fourth HAN relay device 1604. In one embodiment, a TDD link is established between the BSN device 1610 and the fourth HAN relay device 1604.

In one embodiment, the HAN relay devices may be connected to structures, such as buildings, towers, or the like, in the geographic area and the HAN devices may be connected to other smaller structures, such as houses, shorter buildings, shorter towers, or the like, in the geographic area. The HAN relay devices define three sectors and the HAN devices are disposed at structures located within one of the three sectors. In one embodiment, the BSN device 1610 includes three sector antennas 1620, each of the three sector antennas 1620 corresponding to one of three sectors 1631, 1632, 1633. The three sector antennas 1620 may cover a geographic area represented by a hexagon. Each of the three sectors 1631, 1632, 1633 may be assigned a fixed-beam antenna to connect with one or more HAN devices, each HAN device disposed at a structure within the corresponding sector. The wireless connections made with the three sector antennas 1620 are also referred to as part of the backhaul in the WMN 1600.

In a further embodiment, the BSN device 1610 may also be connected (via wired or wireless connections) to the broadband Internet infrastructure 108. For example, the BSN device 1610 can be communicatively coupled to a router that is coupled to an optical fiber connection that provides access to the Internet for the WMN 1600. In one embodiment, the connection is made with a beam-steering antenna (or fixed high-gain antenna). The PtP wireless connection 801 is made between beam-steering antennas (or fixed high-gain antennas), such as high-gain beam-steering antennas as described herein. The PtP wireless connection 801 is also referred to as part of the backhaul of the WMN 800. The four sector antennas 810 and the antenna 820 may use the 5 GHz unlicensed ISM band in a PtMP star configuration. This configuration of the WMN 800 may also be referred to as PtMP sector network.

FIG. 17 illustrates three types of HAN relay devices in the tessellated hexagon topology according to one embodiment. A first type 1702 of HAN relay devices includes four radios to support two HanR-to-HanR FDD links and three radios to support three HanR-to-Han sectors. The four radios could be grouped in two pairs of radios. For example, a first pair may include a first radio to transmit data to an adjacent HAN relay device via a first FDD link and a second radio to receive data from the adjacent HAN relay via a second FDD link. A second pair may include a third radio to transmit data to another adjacent HAN relay device via a third FDD link and a fourth radio to receive data from the other adjacent HAN relay device via a fourth FDD link. A second type 1704 of HAN relay devices includes six radios to support three HanR-to-HanR FDD links and three radios to support three HanR-to-Han sectors. Similar to the first type 1702, the six radios of the second type 1704 can be grouped into three pairs of radios, each pair corresponding to one neighboring HAN relay device. A third type 1706 of HAN relay devices includes four radios to support two HanR-to-HanR FDD links, one radio to support a BSN-to-HanR TDD connection, and three radios to support three HanR-to-Han sectors. Similar to the first type 1702, the four radios of the third type 1706 can be grouped into two pairs of radios, each pair corresponding to one neighboring HAN relay device.

FIG. 18 illustrates a WMN 1800 with three independent linear sub-mesh networks 1609, 1809, 1819 connected to the BSN device 1610 according to one embodiment. The WMN 1800 includes various HAN relay devices organized in at least three independent linear sub-mesh networks 1609, as described above with respect to FIG. 16, and a second linear sub-mesh network 1809 and a third linear sub-mesh network 1819. The first linear sub-mesh network 1609 includes a first set of HAN relay devices (seven in the depicted embodiment) organized in a first deployment layout (first hexagon pattern). The second linear sub-mesh network 1809 includes a second set of HAN relay devices (seven in the depicted embodiment) organized in a second deployment layout (second hexagon pattern) that is offset and rotated from the first deployment layout of the first linear sub-mesh network 1609. For example, a first HAN relay device in the respective linear sub-mesh network can be shifted one vertex to the right along the perimeter of the first hexagon pattern to obtain the second hexagon pattern. The third linear sub-mesh network 1819 includes a third set of HAN relay devices (seven in the depicted embodiment) organized in a third deployment layout (third hexagon pattern) that is offset and rotated from the first deployment layout of the first linear sub-mesh network 1609. For example, a first HAN relay device in the respective linear sub-mesh network can be shifted one vertex to the left along the perimeter of the first hexagon pattern to obtain the second hexagon pattern. In another embodiment, the first linear sub-mesh network 1609 is expanded to include five additional HAN relay devices organized in a second hexagon pattern that share a common side with the first hexagon pattern. In another embodiment, the first linear sub-mesh network 1609 is expanded to include additional HAN relay devices organized in a second hexagon pattern, where two of the additional HAN relay devices are common to the seven HAN relay devices of the first hexagon pattern.

In one embodiment, the second set of HAN relay devices of the second linear sub-mesh network device 1809 is organized in a second hexagon pattern and comprises: an eighth HAN relay device 1821 positioned at a first vertex of the second hexagon pattern, a ninth HAN relay device 1822 positioned at a second vertex of the second hexagon pattern, a tenth HAN relay device 1823 positioned at a third vertex of the second hexagon pattern, an eleventh HAN relay device 1824 positioned at a center point in the second hexagon pattern, a twelfth HAN relay device 1825 positioned at a fourth vertex of the second hexagon pattern, and a thirteenth HAN relay device 1826 positioned at a fifth vertex of the second hexagon pattern; and a fourteenth HAN relay device 1827 positioned at a sixth vertex of the second hexagon pattern. In one embodiment, the third HAN relay device, fourth HAN relay device, and the fifth HAN relay device in the first linear sub-mesh network 1609 are disposed on a diagonal 1841 of the first hexagon pattern and the tenth HAN relay device 1823, the eleventh HAN relay device 1824, and the twelfth HAN relay device 1825 are disposed on a diagonal 1842 of the second hexagon pattern. In a further embodiment, the diagonal 1842 is rotated 60 degrees from the diagonal 1841 of the first hexagon pattern in a first direction.

In one embodiment, the third set of HAN relay devices of the third linear sub-mesh network device 1819 is organized in a third hexagon pattern and comprises: a fifteenth HAN relay device 1831 positioned at a first vertex of the third hexagon pattern, a sixteenth HAN relay device 1832 positioned at a second vertex of the third hexagon pattern, a seventeenth HAN relay device 1833 positioned at a third vertex of the third hexagon pattern, an eighteenth HAN relay device 1834 positioned at a center point in the third hexagon pattern, a nineteenth HAN relay device 1835 positioned at a fourth vertex of the third hexagon pattern, and a twentieth HAN relay device 1836 positioned at a fifth vertex of the third hexagon pattern; and a twenty-first HAN relay device 1837 positioned at a sixth vertex of the third hexagon pattern. In one embodiment, the seventeenth HAN relay device 1833, the eighteenth HAN relay device 1834, and the nineteenth HAN relay device 1835 are disposed on a diagonal 1843 of the third hexagon pattern. In a further embodiment, the diagonal 1843 is rotated 60 degrees from the diagonal 1841 of the first hexagon pattern in a second direction.

In a further embodiment, the second linear sub-mesh network 1809 includes: seventh FDD links over which the eighth HAN relay device 1821 and the ninth HAN relay device 1822 communicate; eighth FDD links over which the ninth HAN relay device 1822 and the tenth HAN relay device 1823 communicate; ninth FDD links over which the tenth HAN relay device 1823 and the eleventh HAN relay device 1824 communicate; tenth FDD links over which the eleventh HAN relay device 1824 communicates with the twelfth HAN relay device 1825 communicate; eleventh FDD links over which the twelfth HAN relay device 1825 device communicates with the thirteenth HAN relay device 1826 communicate; and twelfth FDD links over which the thirteenth HAN relay device 1826 communicates with the fourteenth HAN relay device 1827 communicate. In a further embodiment, the third linear sub-mesh network 1819 further includes: thirteenth FDD links over which the fifteenth HAN relay device 1831 and the sixteenth HAN relay device 1832 communicate; fourteenth FDD links over which the sixteenth HAN relay device 1832 and the seventeenth HAN relay device 1833 communicate; fifteenth FDD links over which the seventeenth HAN relay device 1833 and the eighteenth HAN relay device 1834 communicate; sixteenth FDD links over which the eighteenth HAN relay device 1834 communicates with the nineteenth HAN relay device 1835 communicate; seventeenth FDD links over which the nineteenth HAN relay device 1835 communicates with the twentieth HAN relay device 1836 communicate; and eighteenth FDD links over which the twentieth HAN relay device 1836 communicates with the twenty-first HAN relay device 1837 communicate.

In one embodiment, the geographic area in which the twenty-one HAN relay devices are organized as a base unit of three linear sub-mesh networks may be approximately 650 meters by 650 meters. Alternatively, the base unit can include more or less HAN relay devices than twenty-one and can cover different sizes of geographic areas.

The embodiments of the WMNs described herein can benefit from frequency planning. In particular, a WMN may use various radio technologies and wireless standards for different types of communications between different network devices. For example, the WMN may use 60 GHz band, including channels 1, 2, and 3 in the 802.11ad standard, 70 GHz and 80 GHz band, and 2.4 GHz and 5 GHz bands in the 802.11ac standard. The 60 GHz band can permit 2.16 GHz for each channel. The 60 GHz band may be used for HanR-to-HanR links, but may not be suitable for long distances due to regulatory requirements on the adjacent bands. However, as described herein, the deployment layouts described herein, such as the hexagon pattern, may reduce the interference between the channels due to the direction of transmissions by the HAN relay devices when organized in the deployment layouts. FDD links are possible using the 60 GHz bands. The 70 GHz and 80 GHz band may use specialized hardware for the BSN-to-BSN links. The 70 GHz and 80 GHz bands may have a 6 GHz maximum in each frequency band. FDD links are possible using the 70 GHz and 80 GHz bands. The 2.5 GHz and 5 GHz radios may achieve 20, 40, and 80 MHz channel bandwidth and may support multi-user MIMO (MU-MIMO). In addition, as described below with respect to FIG. 19, different technologies can be used for different layers of the WMN.

Figure 19:
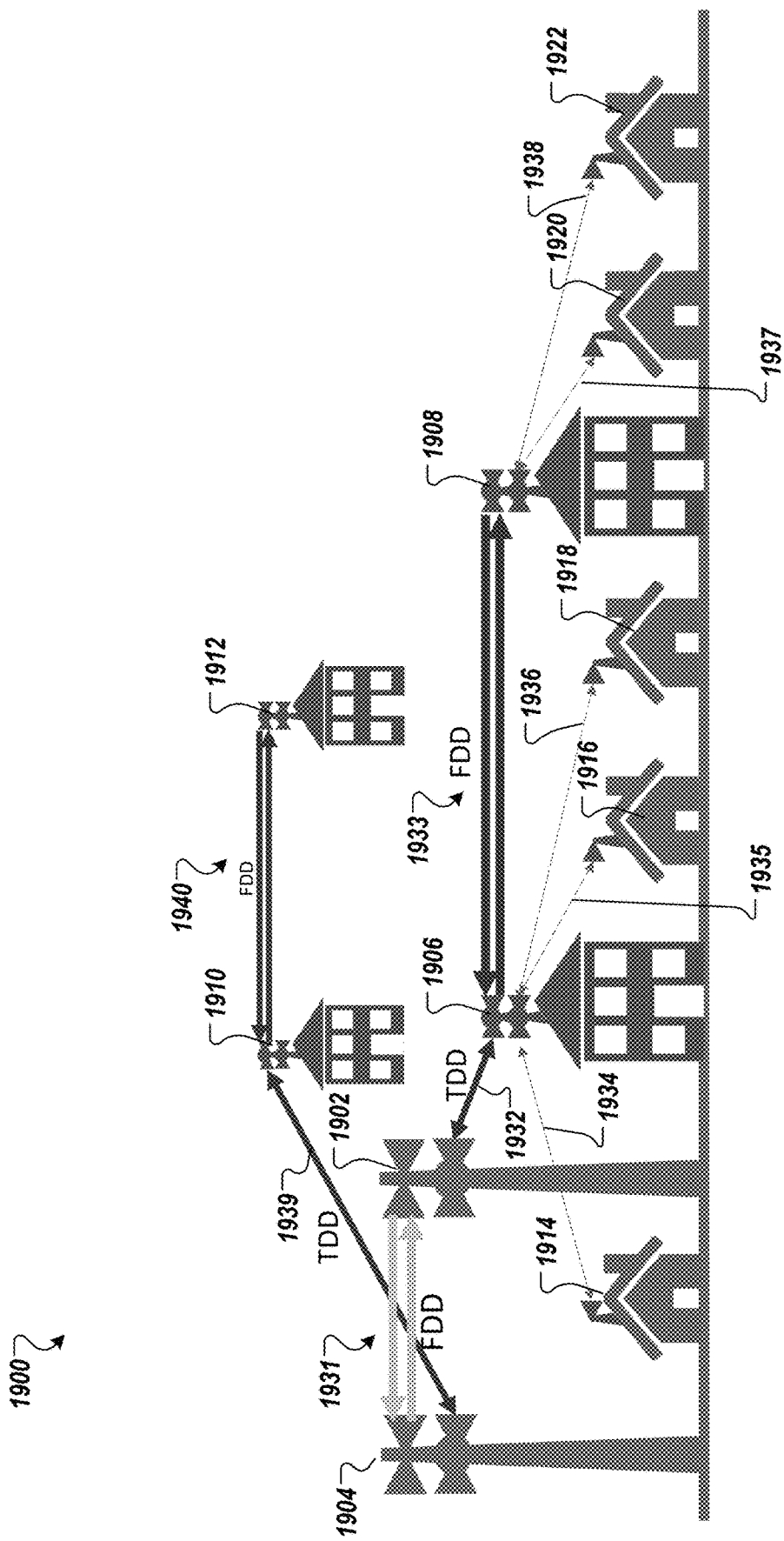
FIG. 19 illustrates a portion of a WMN with two BSN devices, four HAN relay devices, and five HAN devices and corresponding wireless links according to one embodiment.

FIG. 19 illustrates a portion of a WMN 1900 with two BSN devices 1902, 1904, four HAN relay devices 1906-1912, and five HAN devices 1914-1922 and corresponding wireless links according to one embodiment. In the WMN 1900, a first BSN device 1902 communicates with a second BSN device 1904 via FDD links 1931. The first BSN device 1902 communicates with a first HAN relay device 1906 via TDD link 1932. The first HAN relay device 1906 communicates with a second HAN relay device 1908 via FDD links 1933 and communicates with a first HAN device 1914 via a first wireless connection 1934, a second HAN device 1916 via a second wireless connection 1935, and a third HAN device 1918 via a third wireless connection 1936. The second HAN relay device 1908 communicates with a fourth HAN device 1920 via a fourth wireless connection 1937 and a fifth HAN device 1922 via a fifth wireless connection 1938. The second BSN device 1904 communicates with a third HAN relay device 1910 via TDD link 1939. The third HAN relay device 1910 communicates with a fourth HAN relay device 1912 via FDD links 1940. The third HAN relay device 1910 and fourth HAN relay device 1912 may also individually communicate with one or more HAN devices.

In one embodiment, the links are established according to Table 1 below:

| Link | Access Type | Frequency Band | Access Technology | Antenna Type | Link Distance (approx.) |
|---|---|---|---|---|---|
| BSN ← → BSN | FDD | 70 GHz or 80 GHz (E-band - no interference) | Specialized Hardware Technology | Dish/ Horn | ~1 Km |
| BSN ← → HanR | TDD Or FDD | 60 GHz (TDD) or 70 GHhz/ 80 GHz (FDD) | 802.11 ad or Specialized Hardware Technology | 23 dBi array antenna Or Dish/ Horn | ~100 m or ~100-1 Km if E-band |
| HanR ← → HanR | FDD | 60 GHz | Modified 802.11 ad | 23 dBi array antenna | ~300 m |
| HanR ← → Han | CSMA | 60 GHz + 5 GHz | 802.11 ad + 802.11 ac MU-MIMO | 23 dBi array antenna for 60 GHz, omni for 5 GHz | <100 m |

Figure 20:
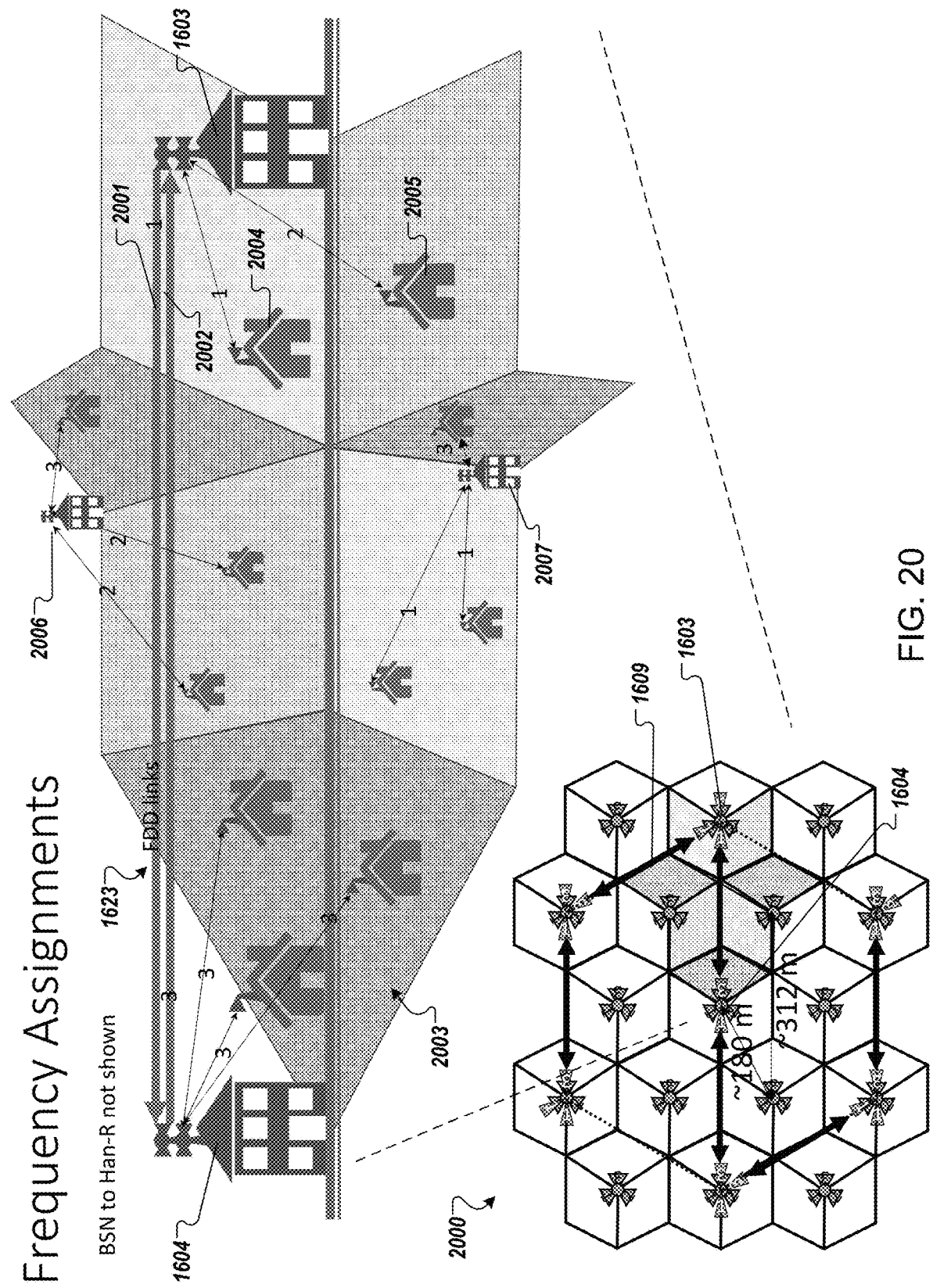
FIG. 20 illustrates a portion of a WMN including FDD links between two HAN relay devices according to one embodiment.

FIG. 20 illustrates a portion of a WMN 2000 including FDD links between two HAN relay devices according to one embodiment. The WMN 2000 includes the first linear sub-mesh network 1609 of FIG. 16. The exploded view illustrates the FDD links 1623 between the third HAN relay device 1603 at the third vertex and the fourth HAN relay device 1604 at the center point in the first hexagon pattern. In particular, the third HAN relay device 1603 transmits data via a first channel of the 60 GHz band for a first FDD link 2001. The fourth HAN relay device 1604 receives the data transmitted by the third HAN relay device 1603 via the first channel. The fourth HAN relay device 1604 transmits data via a third channel of the 60 GHz band for a second FDD link 2002. The third HAN relay device 1603 receives the data transmitted by the fourth HAN relay device 1604 via the third channel. The fourth HAN relay device 1604 can also transmit data via a first channel of the 60 GHz band for a FDD link between the fourth HAN relay device 1604 and the fifth HAN relay device 1605 located at the sixth vertex in the first mesh pattern. Similarly, the third HAN relay device 1603 can transmit data via the first channel for a FDD link between the third HAN relay device 1603 and the second HAN relay device 1602 at the second vertex. Although the third HAN relay device 1603 transmits using the same first channel, the third HAN relay device 1603 can transmit the data without interference or with minimal interface, since this data is transmitted in a direction that is greater than 45 degrees from the direction that the data is transmitted to the fourth HAN relay device 1604.

As illustrated in FIG. 20, the fourth HAN relay device 1604 transmits data to and receives data from HAN devices 2003 in a third sector using a third sector antenna. The third HAN relay device 1603 transmits data to and receives data from a HAN device 2004 in a first sector using a first sector antenna and transmits data to and receives data from a HAN device 2005 in a second sector using a second sector antenna. It should be noted that the HAN relay device 2006 is part of a second linear sub-mesh network and the HAN relay device 2007 is part of a third linear sub-mesh network.

Also, as illustrated in FIG. 20, the HAN relay device 1604 may include a fourth radio to communicate with a HAN device located in a first sector within the first hexagon pattern, a fifth radio to communicate with a HAN device located in a second sector within the first hexagon pattern, and a sixth radio to communicate with a HAN device located in a third sector within the first hexagon pattern. The first sector can be defined as a geographic area in which a signal, having a predetermined signal strength, successfully communicates data between the fourth radio and another device. The second sector can be defined as a geographic area in which a signal, having a predetermined signal strength, successfully communicates data between the fifth radio and a device. The third second sector can be defined as a geographic area in which a signal, having a predetermined signal strength, successfully communicates data between the sixth radio and a device. The first sector covers 120 degrees of the first hexagon pattern, the second sector covers another 120 degrees of the first hexagon pattern, and the third sector covers another 120 degrees of the first hexagon pattern.

Figure 21A:
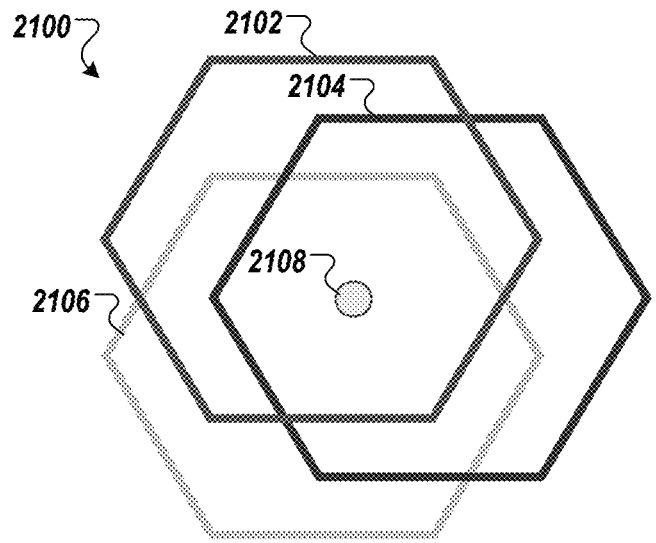
FIG. 21A illustrates a first-tier of a wireless mesh network containing three linear sub-mesh networks according to one embodiment.

FIG. 21A illustrates a first tier 2100 of a wireless mesh network containing three linear sub-mesh networks 2102, 2104, 2106 according to one embodiment. The first linear sub-mesh network 2102 includes multiple HAN relay devices organized in a first hexagon pattern, as illustrated and described above with respect to FIG. 16 and FIG. 18. The second linear sub-mesh network 2104 includes multiple HAN relay devices organized in a second hexagon pattern. The third linear sub-mesh network 2106 includes multiple HAN relay devices organized in a third hexagon pattern. A BSN device 2108 is coupled to at least one HAN relay device of the first linear sub-mesh network 2102, at least one HAN relay device of the second linear sub-mesh network 2104, and at least one HAN relay device of the third linear sub-mesh network 2106. In one embodiment, the HAN relay devices in the first hexagon pattern, the second hexagon pattern, and the third hexagon pattern form a base unit in a WMN that can be scaled or expanded to include additional HAN relay devices. The base unit may also be referred to as a basic tile that is used as the basic building block of scaled WMNs. For example, a tessellated unit of HAN relay devices can be a replicate of the base unit and can be disposed adjacent to the base unit to expand the WMN. In one embodiment, the base unit can be replicated to form a honeycomb tessellation of hexagons. The first tier has at least one HAN relay device of each of the first linear sub-mesh network, the second linear sub-mesh network, and the third linear sub-mesh network coupled to the BSN device directly without any intervening HAN relay devices. In a second tier, none of the HAN relay devices directly couple to the BSN device, but are connected to a first tier in which at least one of the HAN relay devices of the respective linear sub-mesh network is coupled to the BSN directly. The WMN can have more than one or two tiers.

Figure 21B:
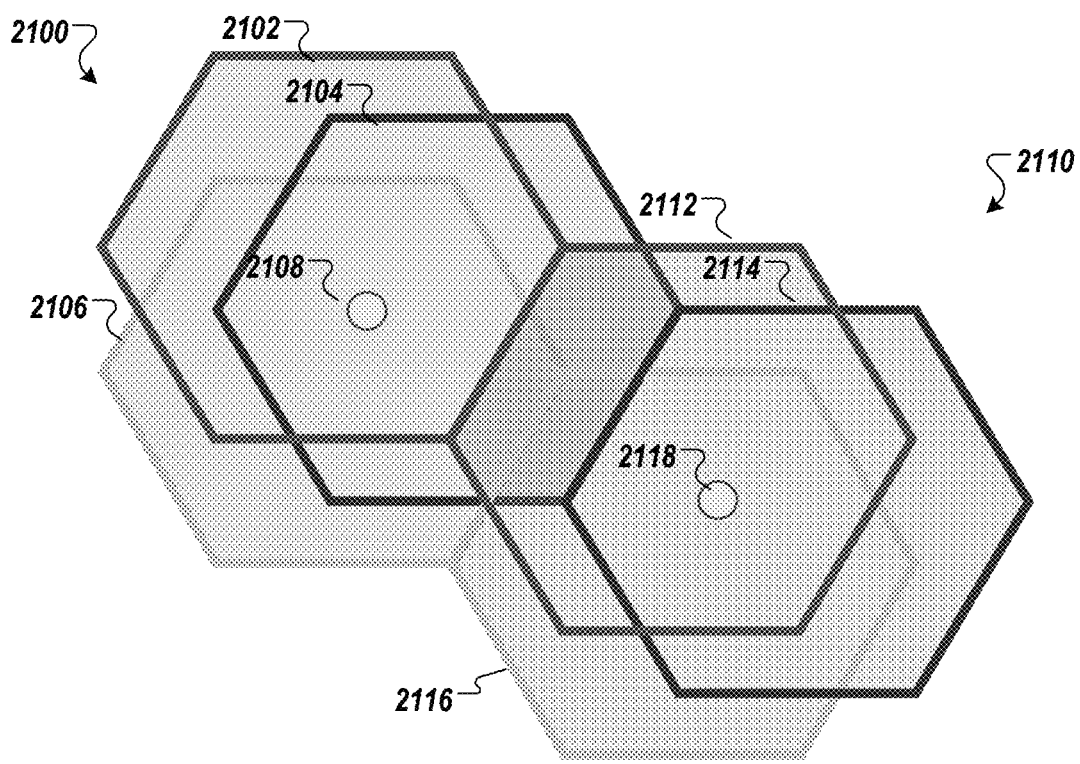
FIG. 21B illustrates an expanded wireless mesh network containing two adjoining first-tier wireless mesh networks with common edges according to one embodiment.

It should be noted that the linear sub-mesh network can be replicated to expand coverage of the linear sub-mesh network itself. Similarly, the three linear sub-mesh networks as the base unit can be replicated to expand coverage of the base unit within the WMN. For example, any edge of one hexagon with a linear sub-mesh network can be joined with another edge of another hexagon within the same linear sub-mesh network so long as the edges are the same length. Hexagons can be joined to form a larger network, such as illustrated in FIG. 21B. As FIG. 21A illustrates a first tier, FIG. 21B illustrates another first tier base unit that is joined in 3 ways to the base unit of the first tier in FIG. 21A.

FIG. 21B illustrates an expanded wireless mesh network containing two adjoining first-tier wireless mesh networks with common edges according to one embodiment. The expanded wireless mesh network contains the first tier 2100 of FIG. 21A as noted by similar reference numbers. The expanded wireless mesh network also contains a second first-tier wireless mesh network 2110 that is a replicate of the first tier 2100. The first tier 2100 and the second first-tier wireless mesh network 2110 share common HAN relay devices on the adjoining sides of the hexagon pattern.

A first linear sub-mesh network 2112 includes multiple HAN relay devices organized in a first hexagon pattern, as illustrated and described above with respect to FIG. 16 and FIG. 18. At least two of the HAN relay devices are common to the first linear sub-mesh network 2112 and the first linear sub-mesh network 2102. A second linear sub-mesh network 2114 includes multiple HAN relay devices organized in a second hexagon pattern. At least two of the HAN relay devices are common to the second linear sub-mesh network 2114 and the second linear sub-mesh network 2104. A third linear sub-mesh network 2116 includes multiple HAN relay devices organized in a third hexagon pattern. At least two of the HAN relay devices are common to the third linear sub-mesh network 2116 and the third linear sub-mesh network 2106. A second BSN device 1218 is coupled to at least one HAN relay device of the first linear sub-mesh network 2112, at least one HAN relay device of the second linear sub-mesh network 2114, and at least one HAN relay device of the third linear sub-mesh network 2116.

Figure 21C:
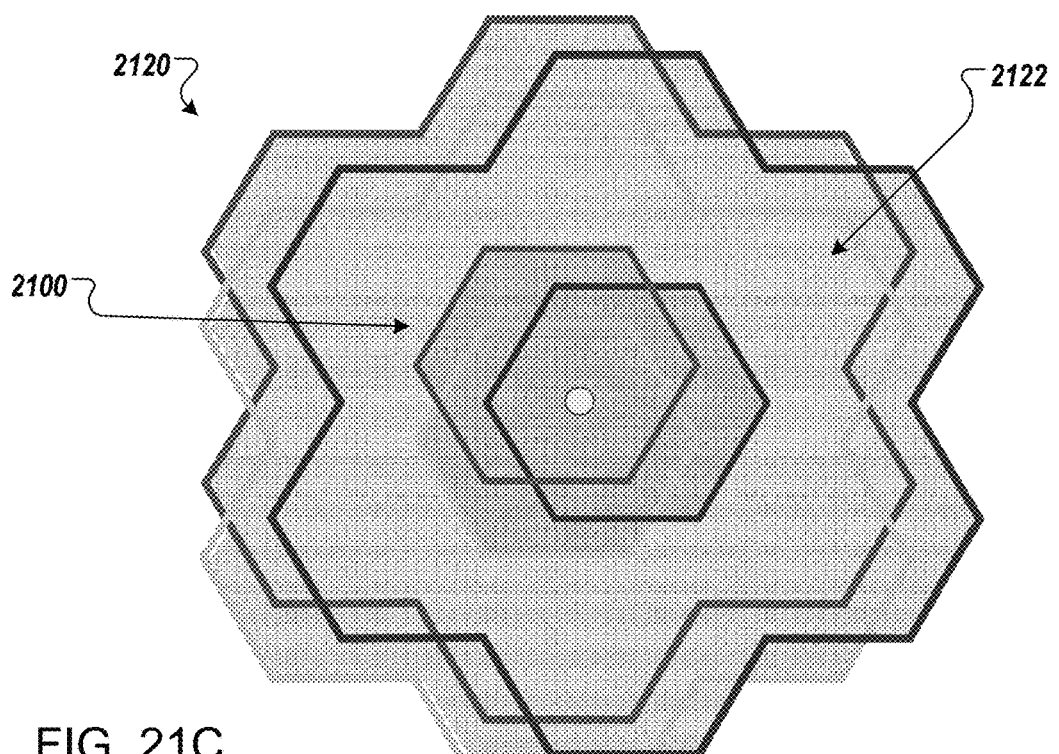
FIG. 21C illustrates an expanded wireless mesh network containing a first tier and a second tier of three linear sub-mesh networks according to one embodiment.
Figure 21D:
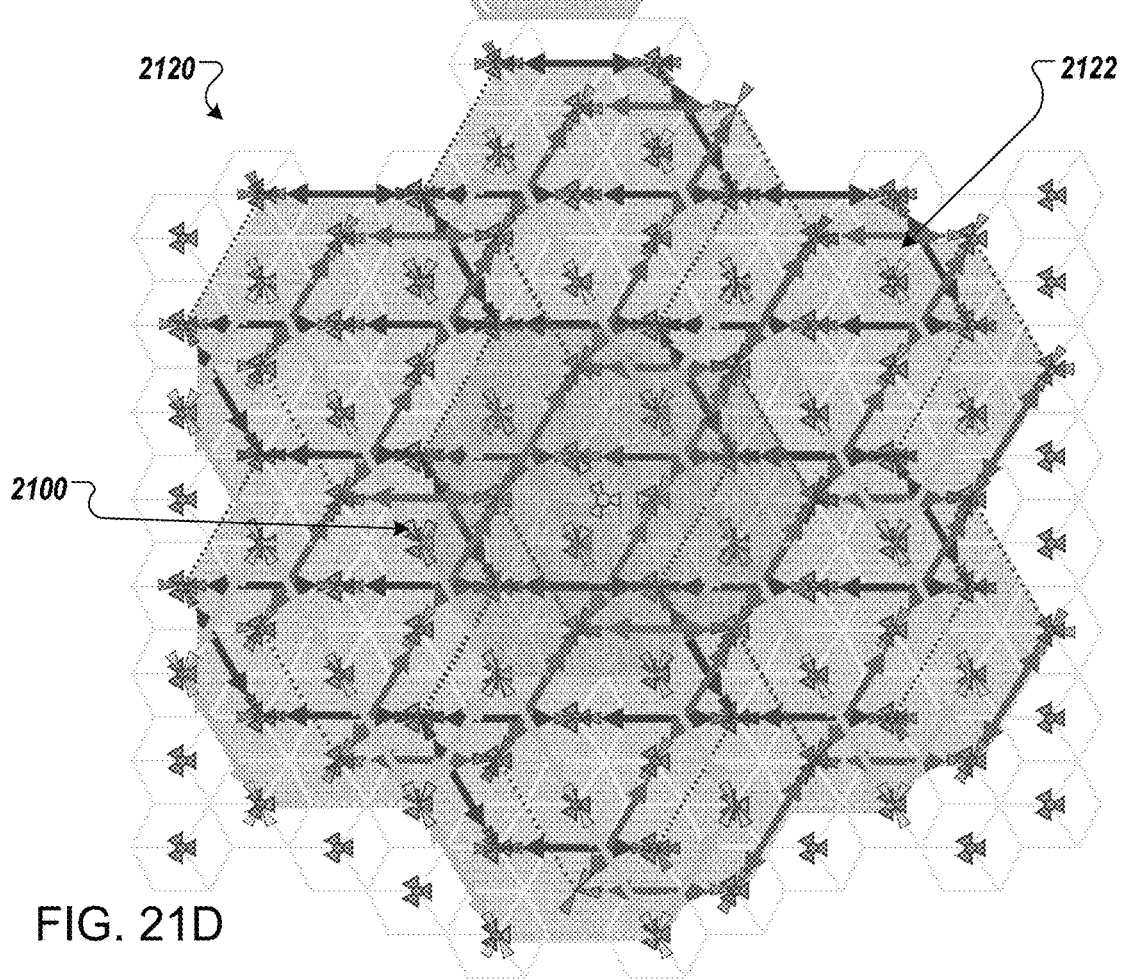
FIG. 21D illustrates FDD links between HAN relay devices in the third linear sub-mesh networks in the first tier and second tier of the expanded wireless mesh network of FIG. 21C according to one embodiment.

In addition to expanding the wireless mesh network by replicating 1-tier network coverage, in other embodiments, the wireless mesh network can be expanded by replicating the hexagon pattern to form a 2-tier network base unit as described and illustrated with respect to FIGS. 21C-21D. For example, seven HAN relay devices of the first linear sub-mesh network are organized in a first hexagon pattern; seven HAN relay devices of the second linear sub-mesh network are organized in a second hexagon pattern; and seven HAN relay devices of the third linear sub-mesh network are organized in a third hexagon pattern. The twenty-one HAN relay devices in the first hexagon pattern, the second hexagon pattern, and the third hexagon pattern, collectively, are part of a first tier of the wireless mesh network. The wireless mesh network can be expanded to include a second tier of additional HAN relay devices. For example, the HAN relay devices in the first hexagon pattern, the second hexagon pattern, and the third hexagon pattern form a base unit in the wireless mesh network. The wireless mesh network can be expanded to include a tessellated unit of HAN relay devices that is a replicate of the base unit. These tessellated units can also be replicated in various manners as described herein. In another embodiment, a first tier includes a base unit of the first hexagon pattern, the second hexagon pattern, and the third hexagon pattern and a second tier includes six replicate units of the base unit, each of the six replicate units share a common side with one of the six sides of the base unit. The first tier and the second tier can form a network replication unit. The network replication unit can also be replicated in the wireless mesh network.

FIGS. 21C-21D illustrate an expanded wireless mesh network 2120 containing a first tier and a second tier of three linear sub-mesh networks according to one embodiment. The expanded wireless mesh network 2120 includes the first tier 2100 containing three linear sub-mesh networks 2102, 2104, 2106 described with respect to FIG. 21A. In addition, the expanded wireless mesh network 2120 includes six replicate units of the three linear sub-mesh networks in each direction of the original hexagon patterns. While FIG. 21C illustrates just an outline perimeter of the first tier and the second tier of each of the three linear sub-mesh networks 2102, 2104, 2106, FIG. 21D illustrates the HAN relay devices at the vertices of the hexagons and the FDD links between the HAN relay devices for the first tier and the second tier. For example, a single HAN relay device of the first set is positioned at each of the six vertices of the first hexagon pattern and a remaining HAN relay device of the first set is positioned at a center point of the first hexagon pattern. A single HAN relay device of the second set is positioned at each of the six vertices of the second hexagon pattern and a remaining HAN relay device of the second set is positioned at a center point of the second hexagon pattern. A single HAN relay device of the third set is positioned at each of the six vertices of the third hexagon pattern and a remaining HAN relay device of the third set is positioned at a center point of the third hexagon pattern. The three linear sub-mesh networks 2102, 2104, 2106 are replicated in six direction (each side of the respective hexagon) and share common HAN relay devices on adjoining sides.

In one embodiment, the WMN includes a first tier including a base unit of the first hexagon pattern, the second hexagon pattern, and the third hexagon pattern, as described above with respect to FIG. 18. The WMN also includes a second tier including six replicate units of the base unit, each of the six replicate units share a common side with one of the six sides of the base unit. In a further embodiment, the first tier and the second tier form a network replication unit. The WMN, in other embodiments, may include at least one replicate of the network replication unit, such as illustrated in the replications in FIG. 22. In another embodiment, at least one hexagon pattern in a second tier of the at least one replicate is common to the second tier of the network replication unit.

Figure 22:
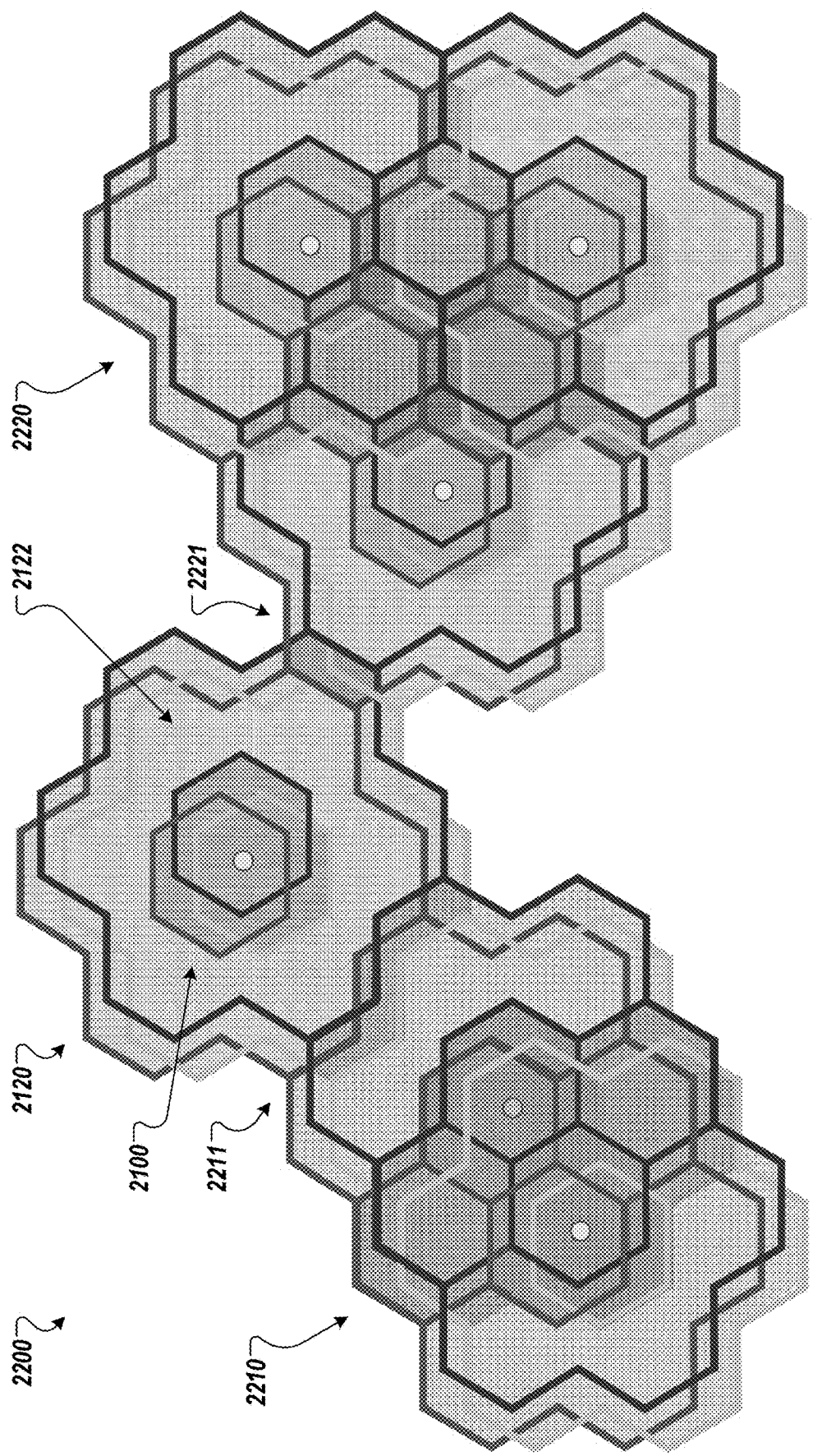
FIG. 22 illustrates 2-tier network replication according to another embodiment.

FIG. 22 illustrates 2-tier network replication according to another embodiment. In the depicted embodiment, the WMN 2200 includes the expanded wireless mesh network 2120 of FIG. 22 with the first tier 2100 and the second tier 2122 of three linear sub-mesh networks. The expanded wireless mesh network 2120 can be considered the base unit and can be replicated to expand the WMN 2200. For example, as illustrated, a two-tier, two-BSN based replicate 2210. In particular, the replicate 2210 of the expanded wireless mesh network 2120 can share an edge 2211 with the expanded wireless mesh network 2120 and the replicate can be replicated with common edges in first tiers of the replicates. For another example, as illustrated a two-tier, three-BSN based replicate 2220. In particular, the replicate 2220 of the expanded wireless mesh network 2120 can share an edge 2221 with the expanded wireless mesh network 2120 and the replicate 2220 can be replicated with common edges in the second tiers of the replicates.

As described herein the WMN can use dynamic mesh configuration. Each BSN transceiver can select any one of HAN relays within its sector as its first mesh node. Prior to the deployment of the BSN and HAN relays, the network control services (also referred to as SDN) evaluates the connection parameters, such as link budget, data rate, path loss, for the like, for all available links between BSN and HAN Relays within its sector and store the connection parameters into its data base for future reference. When the system is operating, SDN continues to review the connection status and choose the most optimum choice for the first BSN transceiver mesh node. Each HAN relay transceiver can also select any one of HAN relays within its reach as its first mesh node. Prior to the deployment of HAN relays, the SDN evaluates the connection parameters, such as link budget, data rate, path loss, or the like, for all available links between HAN relays and store the connection parameters into its data base for future reference. When the system is operating, SDN continues to review the connection status and choose the most optimum choice for the first HAN relay mesh node. Each HAN relay transceiver can also select any one of HAN within its reach as its first mesh node. Prior to the deployment of HAN relays, the SDN evaluates the connection parameters, such as link budget, data rate, path loss, or the like, for all available links between HAN relay and HAN then store the connection parameters into its data base for future reference. When the system is operating, SDN continues to review the connection status between a HAN relay device and HAN devices and choose the most optimum choice for the first HAN relay to HAN mesh node.

Overall, the described architectures should provide dynamically configuring multilevel mesh networks to overcome unintended and unexpected mesh link breakages within the network while shortening the network latency in its mesh network. The network performs the connectivity evaluation timely to improve the maximum performance, but it would initiate the full characterization whenever a new subscriber pattern emerges with addition or deletion of subscribers. The SDN should have lookup tables for all possible connections for all sub-mesh levels, so the reconfiguration of the connections would be done seamlessly. The key link connectivity parameters may include frequency, data rate, power level, path loss, delay time, HAN data consumption rate, connected node, blocked nodes, available nodes, and new or deleted node.

Figure 23:
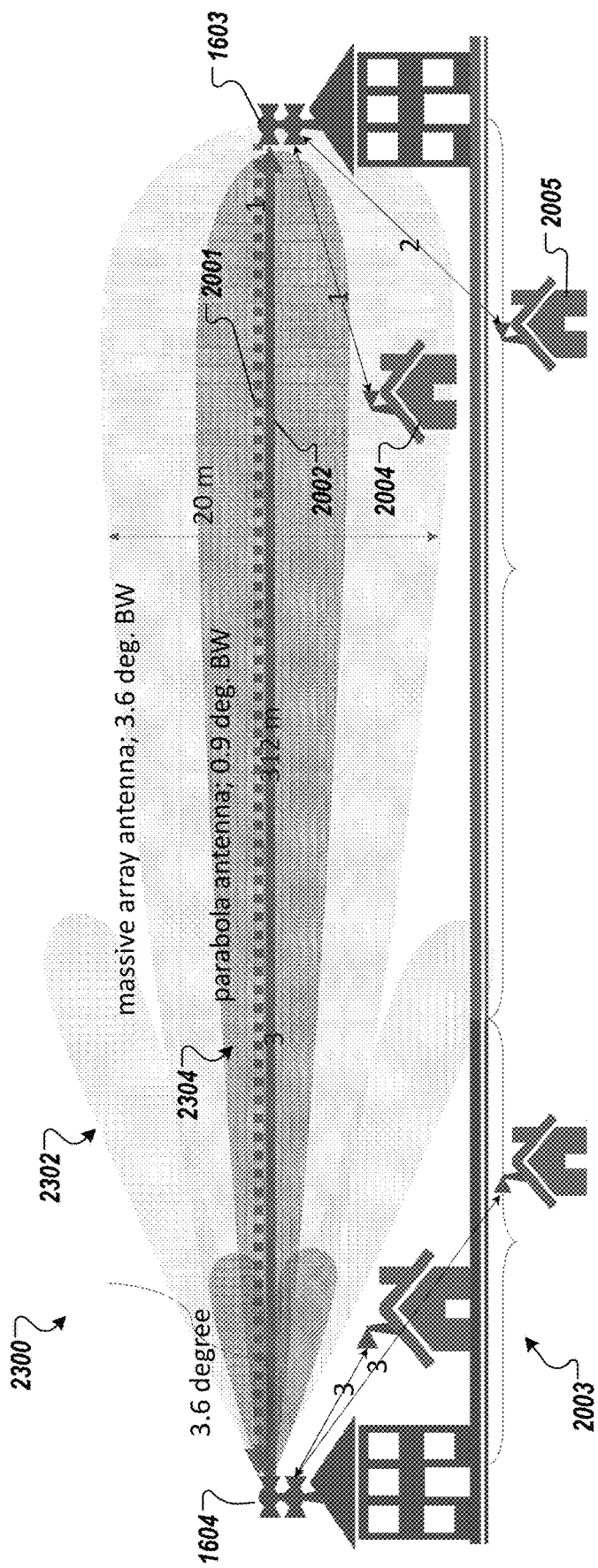
FIG. 23 illustrates antenna radiation patterns of electromagnetic energy between a first HAN relay device and a second HAN relay device according to one embodiment.

FIG. 23 illustrates antenna radiation patterns 2300 of electromagnetic energy between a first HAN relay device and a second HAN relay device according to one embodiment. The antenna radiation patterns 2300 are illustrated in the context of the exploded view from FIG. 20. As described above with respect to FIG. 20, the exploded view illustrates the FDD links 1623 between the third HAN relay device 1603 at the third vertex and the fourth HAN relay device 1604 at the center point in the first hexagon pattern. In particular, the third HAN relay device 1603 transmits data via a first channel of the 60 GHz band for a first FDD link 2001. The fourth HAN relay device 1604 receives the data transmitted by the third HAN relay device 1603 via the first channel. The fourth HAN relay device 1604 transmits data via a third channel of the 60 GHz band for a second FDD link 2002. The third HAN relay device 1603 receives the data transmitted by the fourth HAN relay device 1604 via the third channel. The fourth HAN relay device 1604 can also transmit data via a first channel of the 60 GHz band for a FDD link between the fourth HAN relay device 1604 and the fifth HAN relay device 1605 located at the sixth vertex in the first mesh pattern. Similarly, the third HAN relay device 1603 can transmit data via the first channel for a FDD link between the third HAN relay device 1603 and the second HAN relay device 1602 at the second vertex.

In one embodiment, the fourth HAN relay device 1604 transmits data via the third channel of the 60 GHz band for the second FDD link 2002 using a phase array antenna, causing an antenna radiation pattern 2302. The phase array antenna may have 3.6 degree bandwidth and the antenna radiation pattern 2302 may extend approximately 312 meters in length and 20 meters in height. In another embodiment, the fourth HAN relay device 1604 transmits the data via the third channel of the 60 GHz band for the second FDD link 2002 using a parabola antenna, causing an antenna radiation pattern 2304. The parabola antenna may have 0.9 degree bandwidth and the antenna radiation pattern 2304 may extend approximately 312 meters in length and less than 20 meters in height. In one embodiment, the phase array antenna interference can be mitigated using a metal deflector, as illustrated and described with respect to FIG. 24.

Figure 24:
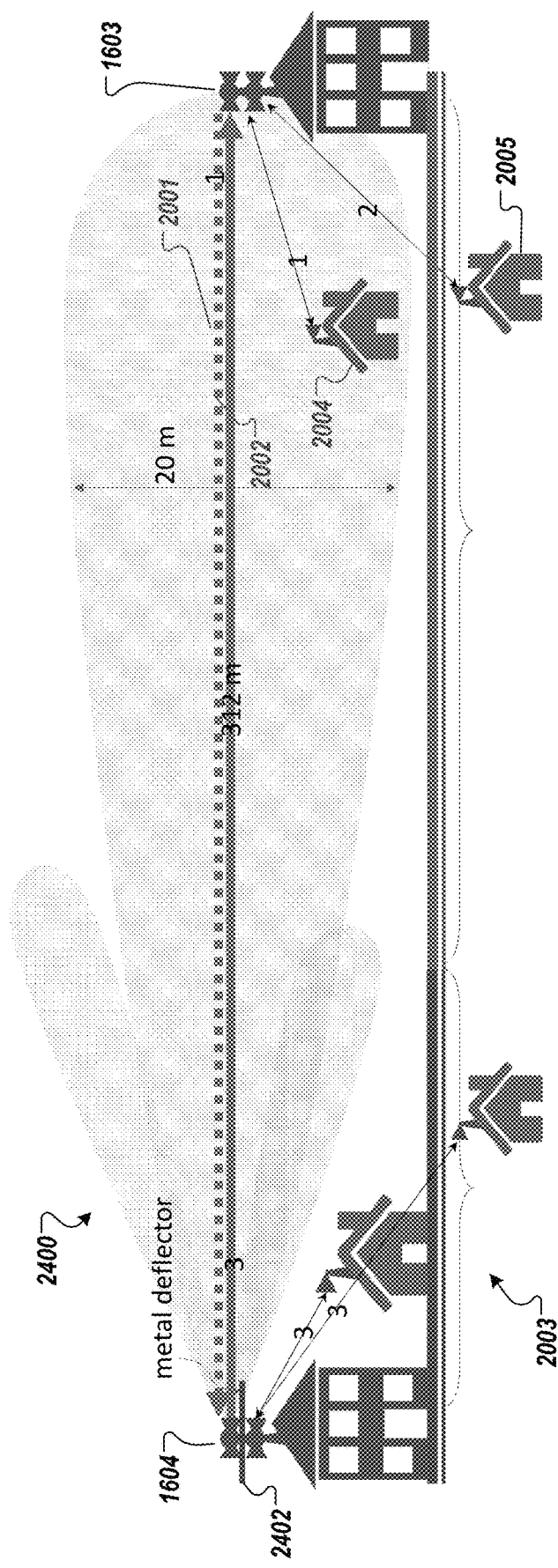
FIG. 24 illustrates an antenna radiation pattern of electromagnetic energy between a first HAN relay device and a second HAN relay device according to another embodiment.

FIG. 24 illustrates an antenna radiation pattern 2400 of electromagnetic energy between a first HAN relay device and a second HAN relay device according to another embodiment. The antenna radiation pattern 2400 is illustrated in the context of the exploded view from FIG. 20 as noted by similar reference numbers. In one embodiment, the fourth HAN relay device 1604 transmits data via the third channel of the 60 GHz band for the second FDD link 2002 using a phase array antenna, causing the antenna radiation pattern 2400. The phase array antenna may have 3.6 degree bandwidth and the antenna radiation pattern 2302 may extend approximately 312 meters in length and 20 meters in height. A metal defector 2402 is disposed below the phase array antenna to reduce interference with other radios and antennas. Although the radiation pattern 2400 and the radiation pattern 2302 may be similar in shape, the metal deflector 2402 can cause the radiation pattern 2302 to stay higher than the HAN devices located in close proximity to the HAN relay device 1604. That is, the metal deflector 2402 can cause a pattern that extends a distance from the HAN relay device at which HAN devices can be placed at a lower height little or no interference from the radiation pattern 2400.

Figure 25:
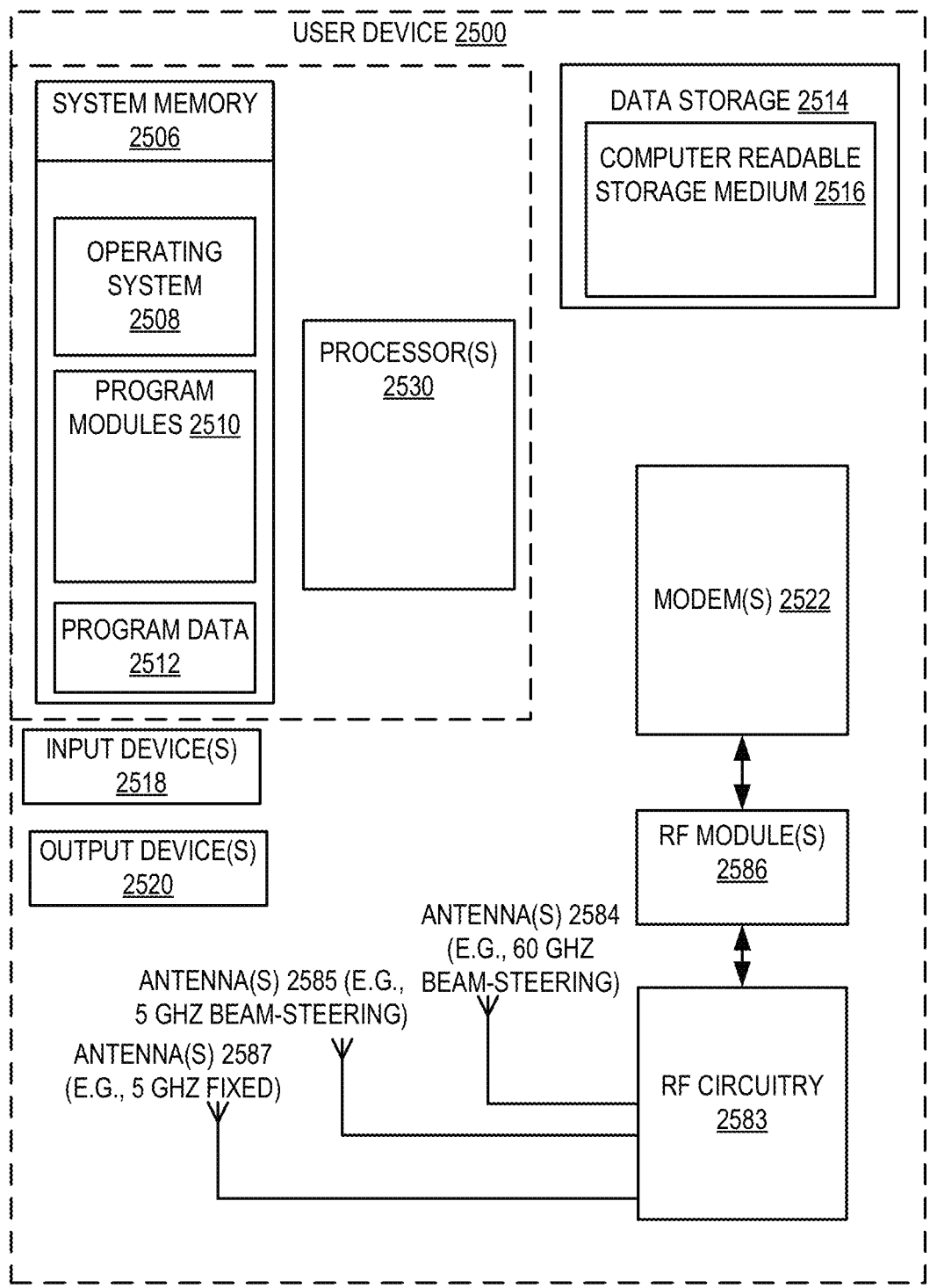
FIG. 25 is a block diagram of a network hardware device according to one embodiment.

FIG. 25 is a block diagram of a network hardware device 2500 according to one embodiment. The network hardware device 2500 may correspond to any one of the network hardware device described herein. The network hardware device 2500 includes one or more processor(s) 2530, such as one or more CPUs, microcontrollers, field programmable gate arrays, or other types of processors. The network hardware device 2500 also includes system memory 2506, which may correspond to any combination of volatile and/or non-volatile storage mechanisms. The system memory 2506 stores information that provides operating system component 2508, various program modules 2510, program data 2512, and/or other components. In one embodiment, the system memory 2506 stores instructions of methods to control operation of the network hardware device 2500. The network hardware device 2500 performs functions by using the processor(s) 2530 to execute instructions provided by the system memory 2506.

The network hardware device 2500 also includes a data storage device 2514 that may be composed of one or more types of removable storage and/or one or more types of non-removable storage. The data storage device 2514 includes a computer-readable storage medium 2516 on which is stored one or more sets of instructions embodying any of the methodologies or functions described herein. Instructions for the program modules 2510 may reside, completely or at least partially, within the computer-readable storage medium 2516, system memory 2506 and/or within the processor(s) 2530 during execution thereof by the network hardware device 2500, the system memory 2506 and the processor(s) 2530, also constituting computer-readable media. The network hardware device 2500 may also include one or more input devices 2518 (keyboard, mouse device, specialized selection keys, etc.) and one or more output devices 2520 (displays, printers, audio output mechanisms, etc.).

The network hardware device 2500 further includes a modem 2522 to allow the network hardware device 2500 to communicate via a wireless connections (e.g., such as provided by the wireless communication system) with other computing devices, such as remote computers, an item providing system, and so forth. The modem 2522 can be connected to one or more RF modules 2586. The RF modules 2586 may be a WLAN module, a WAN module, PAN module, GPS module, a 60 GHz radio, a 5 GHz radio, or the like, as described herein. The antenna structures (antenna(s) 2584, 2585, 2587) are coupled to the RF circuitry 2583, which is coupled to the modem 2522. The RF circuitry 2583 may include radio front-end circuitry, antenna switching circuitry, impedance matching circuitry, or the like. The antennas 2584 may be GPS antennas, NFC antennas, other WAN antennas, WLAN or PAN antennas, beam-steering antennas, fixed-beam antennas, or the like. The modem 2522 allows the network hardware device 2500 to handle both voice and non-voice communications (such as communications for text messages, multimedia messages, media downloads, web browsing, etc.) with a wireless communication system. The modem 2522 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 2522 may generate signals and send these signals to antenna(s) 2584 of a first type (e.g., 60 GHz beam-steering), antenna(s) 2585 of a second type (e.g., 5 GHz beam-steering), and/or antenna(s) 2587 of a third type (e.g., 5 GHz fixed-beam), via RF circuitry 2583, and RF module(s) 2586 as descried herein. Antennas 2584, 2585, 2587 may be configured to transmit in different frequency bands and/or using different wireless communication protocols. The antennas 2584, 2585, 2587 may be directional, omnidirectional, or non-directional antennas. In addition to sending data, antennas 2584, 2585, 2587 may also receive data, which is sent to appropriate RF modules connected to the antennas. One of the antennas 2584, 2585, 2587 may be any combination of the antenna structures described herein.

In one embodiment, the network hardware device 2500 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh network devices of the WMN and the second wireless connection may be associated with serving a content file to a client consumption device, as described herein.

Though a modem 2522 is shown to control transmission and reception via antenna (2584, 2585, 2587), the network hardware device 2500 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such are entitled.

What is claimed is:

1. A wireless mesh network (WMN) for broadband connectivity to broadband Internet infrastructure, the WMN comprising:
   a first linear sub-mesh network comprising a first set of home access node (HAN) relay devices;
   a second linear sub-mesh network comprising a second set of HAN relay devices; and
   a third linear sub-mesh network comprising a third set of HAN relay devices,
      wherein the first set of HAN relay devices includes seven HAN relay devices organized in a first hexagon pattern, wherein a single HAN relay device of the first set is positioned at each of the six vertices of the first hexagon pattern and a remaining HAN relay device of the first set is positioned at a center point of the first hexagon pattern, wherein the first hexagon pattern has a first diagonal axis between two of the six vertices and through the center point,
      wherein the second set of HAN relay devices is organized in a second hexagon pattern and a second diagonal axis of the second hexagon pattern is rotated 60 degrees from the first diagonal axis of the first hexagon pattern in a first direction, wherein the second diagonal axis is between two vertices and through a center point of the second hexagon pattern, the center of the second hexagon pattern being offset from the center point of the first hexagon pattern, and
      wherein the third set of HAN relay devices is organized in a third hexagon pattern and a third diagonal axis of the third hexagon pattern is rotated 60 degrees from the first diagonal of the first hexagon pattern in a second direction, and wherein the third diagonal axis is between two vertices and through a center point of the third hexagon pattern, the center of the third hexagon pattern being offset from the center point of the first hexagon pattern.

2. The WMN of claim 1, wherein the second set of HAN relay devices includes seven HAN relay devices organized in the second hexagon pattern, wherein a single HAN relay device of the second set is positioned at each of the six vertices of the second hexagon pattern and a remaining HAN relay device of the second set is positioned at the center point of the second hexagon pattern, wherein the third set of HAN relay devices includes seven HAN relay devices organized in the third hexagon pattern, wherein a single HAN relay device of the third set is positioned at each of the six vertices of the third hexagon pattern and a remaining HAN relay device of the third set is positioned at the center point of the third hexagon pattern.

3. The WMN of claim 1, wherein the first linear sub-mesh network comprises:
   a first frequency-division duplex (FDD) link over which a first HAN relay device and a second HAN relay device of the first set communicate;
   a second FDD link over which the second HAN relay device and a third HAN relay device of the first set communicate;
   a third FDD link over which the third HAN relay device and a fourth HAN relay device of the first set communicate, wherein the fourth HAN relay device is the remaining HAN relay device positioned at the center point;
   a fourth FDD link over which the fourth HAN relay device and a fifth HAN relay device of the first set communicate, wherein the third HAN relay device, the fourth HAN relay device and the fifth HAN relay device are positioned on the first diagonal axis of the first hexagon pattern;
   a fifth FDD link over which the fifth HAN relay device and a sixth HAN relay device of the first set communicate; and
   a sixth FDD link over which the sixth HAN relay device and a seventh HAN relay device of the first set communicate.

4. A wireless mesh network comprising:
   a first home access node (HAN) relay device comprising:
      a first radio to communicate with a base station node (BSN) device;
      a second radio to communicate with a fourth HAN relay device in a first linear sub-mesh network;
      a third radio to communicate with a fifth HAN relay device in the first linear sub-mesh network; and
      a first plurality of radios to communicate with a first set of HAN devices, wherein each HAN device of the first set of HAN devices is an access point that provides Internet connectivity to a client consumption device connected to the respective HAN device, wherein the first HAN relay device and the fourth and fifth HAN relay devices are part a first hexagon pattern in which a HAN relay device is positioned at each of the six vertices of the first hexagon pattern and a HAN relay device is positioned at a center point of the first hexagon pattern;
a second HAN relay device comprising:
a second radio to communicate with a sixth HAN relay device in a second linear sub-mesh network;
a third radio to communicate with a seventh HAN relay device in the second linear sub-mesh network; and
a second plurality of radios to communicate with a second set of HAN devices, wherein each HAN device of the second set of HAN devices is an access point that provides Internet connectivity to a client consumption device connected to the respective HAN device; and
a third HAN relay device comprising:
a second radio to communicate with an eighth HAN relay device in a third linear sub-mesh network;
a third radio to communicate with a ninth HAN relay device in the third linear sub-mesh network; and
a third plurality of radios to communicate with a third set of HAN devices, wherein each HAN device of the third set of HAN devices is an access point that provides Internet connectivity to a client consumption device connected to the respective HAN device.

5. The wireless mesh network of claim 4, wherein the first linear sub-mesh network comprises seven HAN relay devices including the first HAN relay device, wherein the second linear sub-mesh network comprises seven HAN relay devices including the second HAN relay device, and wherein the third linear sub-mesh network comprises seven HAN relay devices including the third HAN relay device.

6. The wireless mesh network of claim 5, wherein the seven HAN relay devices of the first linear sub-mesh network are organized in the first hexagon pattern with six of the seven HAN relay devices each disposed at a vertex of the first hexagon pattern and one of the seven HAN relay devices disposed at the center point of the first hexagon pattern.

7. The wireless mesh network of claim 6, wherein the first plurality of radios comprises:
a fourth radio to communicate with a HAN device located in a first sector within the first hexagon pattern, the first sector being a geographic area that spans 120 degrees of the first hexagon pattern;
a fifth radio to communicate with a HAN device located in a second sector within the first hexagon pattern, the second sector being a geographic area that spans another 120 degrees of the first hexagon pattern; and
a sixth radio to communicate with a HAN device located in a third sector within the first hexagon pattern, the third sector being a geographic area that spans another 120 degrees of the first hexagon pattern.

8. The wireless mesh network of claim 5, wherein the seven HAN relay devices of the first linear sub-mesh network are organized in the first hexagon pattern having a first diagonal axis between two vertices and the center point of the first hexagon pattern, wherein seven HAN relay devices of the second linear sub-mesh network are organized in a second hexagon pattern having a second diagonal axis between two vertices and a center point of the second hexagon pattern, the second hexagon pattern being offset and rotated from the first hexagon pattern, and wherein seven HAN relay devices of the third linear sub-mesh network are organized in a third hexagon pattern.

9. The wireless mesh network of claim 5, wherein the seven HAN relay devices of the first linear sub-mesh network are organized in the first hexagon pattern, and wherein the first linear sub-mesh network comprises a first path of links starting from a first HAN relay device and ending at a seventh HAN relay device and a second path of links starting from the seventh HAN relay device and ending at the first HAN relay device, wherein the first path comprises:
a first link between the first HAN relay device at a first vertex and a second HAN relay device at a second vertex that is adjacent to the first vertex in a first direction around a perimeter of the first hexagon pattern;
a second link between the second HAN relay device and a third HAN relay device at a third vertex that is adjacent to the second vertex in the first direction around the perimeter;
a third link between the third HAN relay device and a fourth HAN relay device at the center point;
a fourth link between the fourth HAN relay device and a fifth HAN relay device at a sixth vertex that is adjacent to the first vertex in a second direction around the perimeter;
a fifth link between the fifth HAN relay device and a sixth HAN relay device at a fifth vertex that is adjacent to the sixth vertex in the second direction around the perimeter; and
a sixth link between the sixth HAN relay device and a seventh HAN relay device at a fourth vertex that is adjacent to the fifth vertex in the second direction around the perimeter.

10. The wireless mesh network of claim 9, wherein the first linear sub-mesh network comprises a second path of links starting from the seventh HAN relay device and ending at the first HAN relay device, wherein the second path comprises:
a seventh link between the seventh HAN relay device at the fourth vertex and the sixth HAN relay device at the fifth vertex;
an eighth link between the sixth HAN relay device and the fifth HAN relay device at the sixth vertex;
a ninth link between the fifth HAN relay device and the fourth HAN relay device at the center point;
a tenth link between the fourth HAN relay device and the third HAN relay device at the third vertex;
an eleventh link between the third HAN relay device and the second HAN relay device at the second vertex; and
a twelfth link between the second HAN relay device and the first HAN relay device at the first vertex.

11. The wireless mesh network of claim 9, wherein the first linear sub-mesh network further comprises five additional HAN relay devices organized in a second hexagon pattern, wherein the second hexagon pattern comprises seven HAN relay devices, two of which are common to the seven HAN relay devices of the first hexagon pattern.

12. The wireless mesh network of claim 9, wherein the first linear sub-mesh network further comprises five additional HAN relay devices organized in a second hexagon pattern that share a common side with the first hexagon pattern.

13. The wireless mesh network of claim 5, wherein the seven HAN relay devices of the first linear sub-mesh network are organized in a first hexagon pattern, wherein seven HAN relay devices of the second linear sub-mesh network are organized in a second hexagon pattern, and wherein seven HAN relay devices of the third linear sub-mesh network are organized in a third hexagon pattern, wherein the HAN relay devices in the first hexagon pattern, the second hexagon pattern, and the third hexagon pattern are part of a first tier of the wireless mesh network in which at least one HAN relay device of each of the first linear sub-mesh network, the second linear sub-mesh network, and the third linear sub-mesh network is coupled to the BSN device directly, and wherein the wireless mesh network comprises a second tier of additional HAN relay devices in which none of the additional HAN relay devices is directly coupled to the BSN device.

14. The wireless mesh network of claim 4, wherein the second radio of the first HAN relay device is to transmit data to the fourth HAN relay device in the first linear sub-mesh network using a first channel and to receive data from the fifth HAN relay device using a second channel that is different than the first channel.

15. The wireless mesh network of claim 4, wherein the second radio of the first HAN relay device is to establish a frequency-division duplex (FDD) link over which the first HAN relay device communicates with the fourth HAN relay device in the first linear sub-mesh network.

16. A wireless mesh network comprising:
   a base station node (BSN) device; and
   a plurality of home access node (HAN) relay devices located in a geographic area and separated from one another by a distance, wherein the plurality of HAN relay devices comprises a first set of HAN relay devices that is organized in a first linear sub-mesh network with a first deployment layout having a S-shape or an inverse S-shape, wherein each of the first set of HAN relay devices establishes a frequency-division duplex (FDD) link between itself and at least one other HAN relay device of the first set, wherein at least one HAN relay device of the first set of HAN relay devices establishes a time-division duplex (TDD) link over which the at least one of the plurality of HAN relay devices communicates with the BSN device, wherein a second HAN relay device of the first set of HAN relay devices comprises:
      a first radio to communicate with a first HAN relay device of the first set of HAN relay devices over a first FDD link in the first linear sub-mesh network;
      a second radio to communicate with a third HAN relay device of the first set of HAN relay devices over a second FDD link in the first linear sub-mesh network; and
      a third radio to communicate with a first HAN device, wherein the first HAN device is an access point that provides Internet connectivity to a first client consumption device connected to the first HAN device.

17. The wireless mesh network of claim 16, wherein the first deployment layout further comprises a first hexagon pattern including six vertices and a center point at which individual HAN relay devices of the first set of HAN relay devices are positioned, and wherein the first linear sub-mesh network further comprises:
   the first FDD link between the first HAN relay device at a first vertex in the first hexagon pattern and the second HAN relay device at a second vertex in the first hexagon pattern;
   the second FDD link between the second HAN relay device and the third HAN relay device at a third vertex in the first hexagon pattern;
   a third FDD link between the third HAN relay device and a fourth HAN relay device at the center point in the first hexagon pattern;
   a fourth FDD link between the fourth HAN relay device and a fifth HAN relay device at a sixth vertex in the first hexagon pattern, the sixth vertex being opposite the third vertex;
   a fifth FDD link between the fifth HAN relay device and a sixth HAN relay device at a fifth vertex in the first hexagon pattern, the fifth vertex being opposite the second vertex; and
   a sixth FDD link between the sixth HAN relay device and a seventh HAN relay device at a fourth vertex in the first hexagon pattern, the fourth vertex being opposite the first vertex.

18. The wireless mesh network of claim 16, wherein the plurality of HAN relay devices further comprises:
   a second set of HAN relay devices that is organized in a second linear sub-mesh network with a second deployment layout that is offset and rotated from the first deployment layout of the first linear sub-mesh network; and
   a third set of HAN relay devices that is organized in a third linear sub-mesh network with a third deployment layout that is offset and rotated from the first deployment layout of the first linear sub-mesh network.

19. The wireless mesh network of claim 16, wherein a fourth HAN relay device of the first set of HAN relay devices comprises:
   a first radio to communicate with the BSN device over the TDD link;
   a second radio to communicate with the third HAN relay device over a third FDD link in the first linear sub-mesh network; and
   a third radio to communicate with a fifth HAN relay device of the first set of HAN relay devices over a fourth FDD link in the first linear sub-mesh network.

20. The wireless mesh network of claim 16, wherein the second HAN relay device of the first set of HAN relay devices further comprises:
   the third radio to communicate with the first HAN device located in a first sector, the first sector being a geographic area in which a signal, having a predetermined signal strength, successfully communicates data between the third radio and a device, wherein the first sector covers 120 degrees of a first hexagon pattern;
   a fourth radio to communicate with a second HAN device located in a second sector, the second sector being a geographic area in which a signal, having a predetermined signal strength, successfully communicates data between the fourth radio and a device, wherein the second sector covers another 120 degrees of the first hexagon pattern, wherein the second HAN device is an access point that provides Internet connectivity to a second client consumption device connected to the second HAN device; and
   a fifth radio to communicate with a third HAN device located in a third sector, the third sector being a geographic area in which a signal, having a predetermined signal strength, successfully communicates data between the fifth radio and a device, wherein the third sector covers another 120 degrees of the first hexagon pattern, wherein the third HAN device is an access point that provides Internet connectivity to a third client consumption device connected to the third HAN device.

* * * * *